United States Patent
Ichikawa

(10) Patent No.: US 10,564,762 B2
(45) Date of Patent: Feb. 18, 2020

(54) ELECTRONIC APPARATUS AND CONTROL METHOD THEREOF

(71) Applicant: CANON KABUSHIKI KAISHA, Tokyo (JP)

(72) Inventor: Sho Ichikawa, Ebina (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 115 days.

(21) Appl. No.: 15/259,556

(22) Filed: Sep. 8, 2016

(65) Prior Publication Data

US 2017/0083145 A1 Mar. 23, 2017

(30) Foreign Application Priority Data

Sep. 17, 2015 (JP) .................................. 2015-184317
Jan. 25, 2016 (JP) .................................. 2016-011884

(51) Int. Cl.
G09G 5/00 (2006.01)
G06F 3/041 (2006.01)
G06F 3/044 (2006.01)
G06F 3/0488 (2013.01)

(52) U.S. Cl.
CPC ............ G06F 3/0416 (2013.01); G06F 3/044 (2013.01); G06F 3/04883 (2013.01)

(58) Field of Classification Search
CPC ...... G06F 3/0416; G06F 3/0412; G06F 3/044; G06F 3/04883; G06F 3/0231; G06F 3/0346; G06F 3/0482; G06F 3/0486; G06F 3/0488; G06F 2203/04108; G06F 2203/041112; G06F 2203/04101

USPC .............................. 345/174, 173; 178/18.06
See application file for complete search history.

(56) References Cited

U.S. PATENT DOCUMENTS

| 8,810,527 | B2 | 8/2014 | Nakagawa | |
|---|---|---|---|---|
| 2011/0175829 | A1* | 7/2011 | Miyazawa | G06F 3/041 345/173 |
| 2013/0181924 | A1* | 7/2013 | Hong | G06F 3/0412 345/173 |
| 2013/0321335 | A1* | 12/2013 | Tokutake | G06F 3/044 345/174 |

(Continued)

FOREIGN PATENT DOCUMENTS

| JP | 2011-134260 A | 7/2011 |
|---|---|---|
| JP | 2013-080999 A | 5/2013 |
| WO | 2015/029632 | 3/2015 |

OTHER PUBLICATIONS

Japanese Office Action dated Aug. 30, 2019 during prosecution of related Japanese application No. 2016-011884. (English-language machine translation included.).

Primary Examiner — Jennifer T Nguyen
(74) Attorney, Agent, or Firm — Venable LLP

(57) ABSTRACT

An electronic apparatus, comprises a touch detection unit configured to detect a touch operation performed on an operation surface by an operation body, a determination unit configured to, on an occurrence of a move operation in which the operation body moves while in contact with the operation surface, determine an operating direction of the move operation under a determination condition that varies according to an approach direction of the operation body toward the operation surface and a control unit configured to perform control to execute a function corresponding to the operating direction determined by the determination unit.

12 Claims, 21 Drawing Sheets

(56) References Cited

U.S. PATENT DOCUMENTS

2014/0085260 A1\* 3/2014 Guarneri ................ G06F 3/044
345/174

\* cited by examiner

FIG. 3G
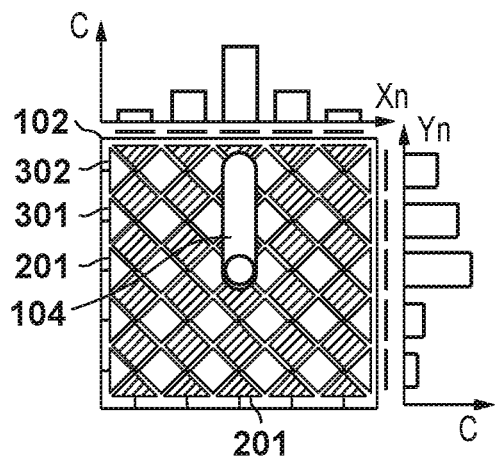
FIG. 3H
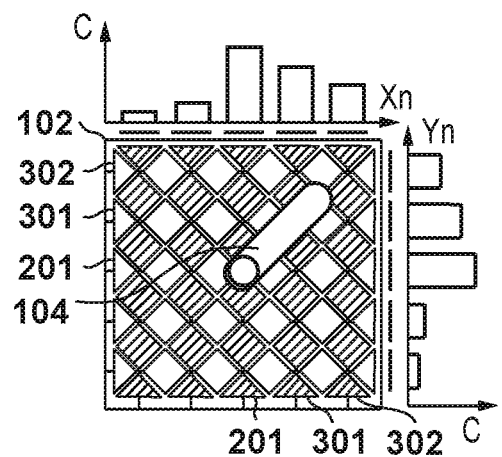
FIG. 3I
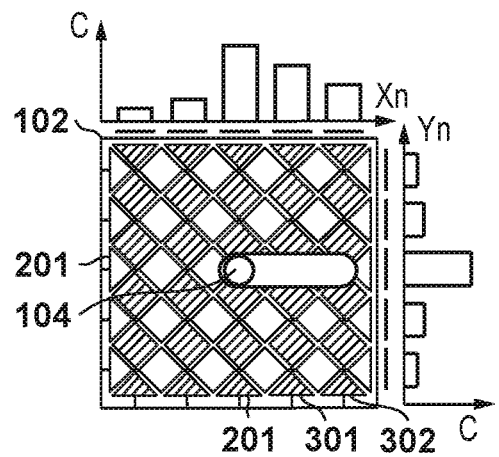
FIG. 3J
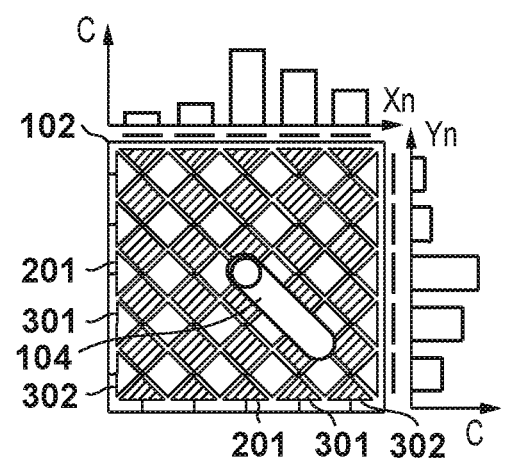
FIG. 4
| 401 | TOUCH APPROACH DIRECTION | | | | | | | |
|---|---|---|---|---|---|---|---|---|
| | FROM DOWN | FROM LOWER LEFT | FROM LEFT | FROM UPPER LEFT | FROM UP | FROM UPPER RIGHT | FROM RIGHT | FROM LOWER RIGHT |
| CONDITION-CHANGE TARGET DIRECTION | UPWARD | LEFTWARD, RIGHTWARD | RIGHTWARD | LEFTWARD, RIGHTWARD | DOWNWARD | LEFTWARD, RIGHTWARD | LEFTWARD | LEFTWARD, RIGHTWARD |

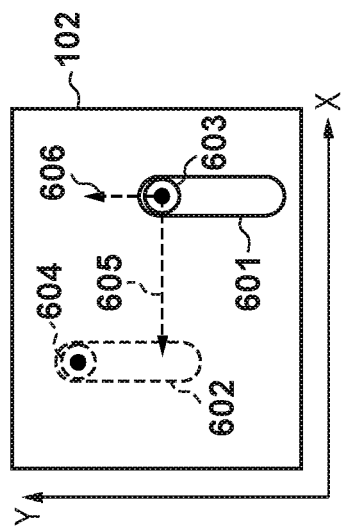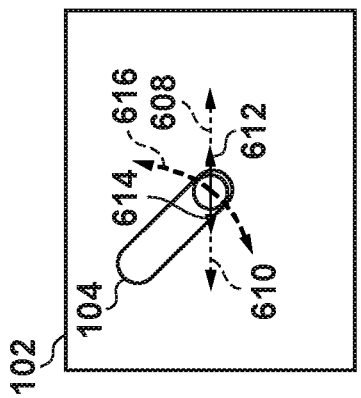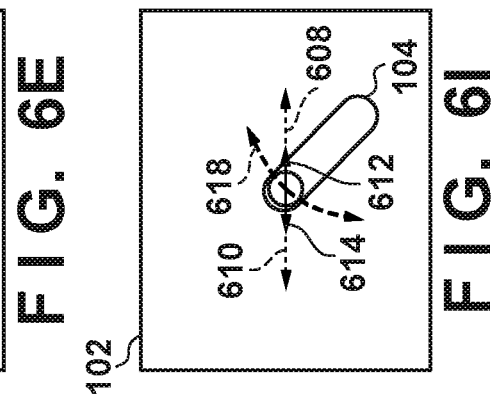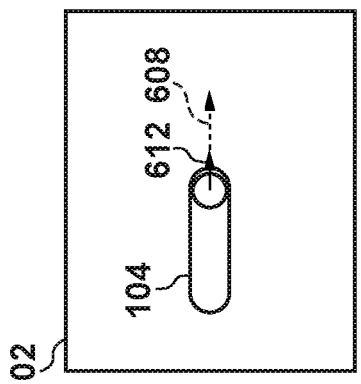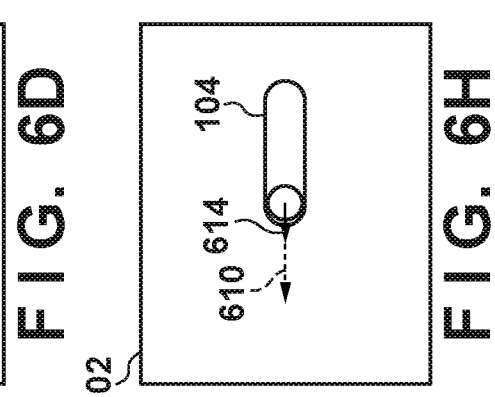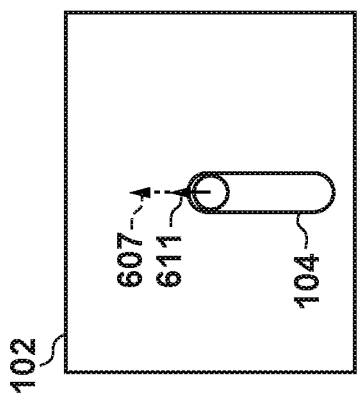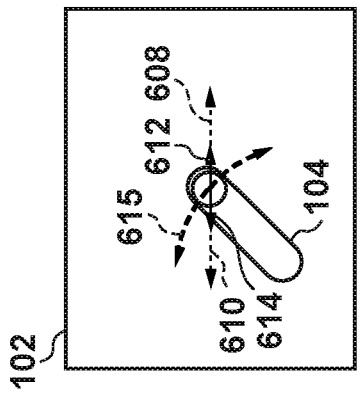

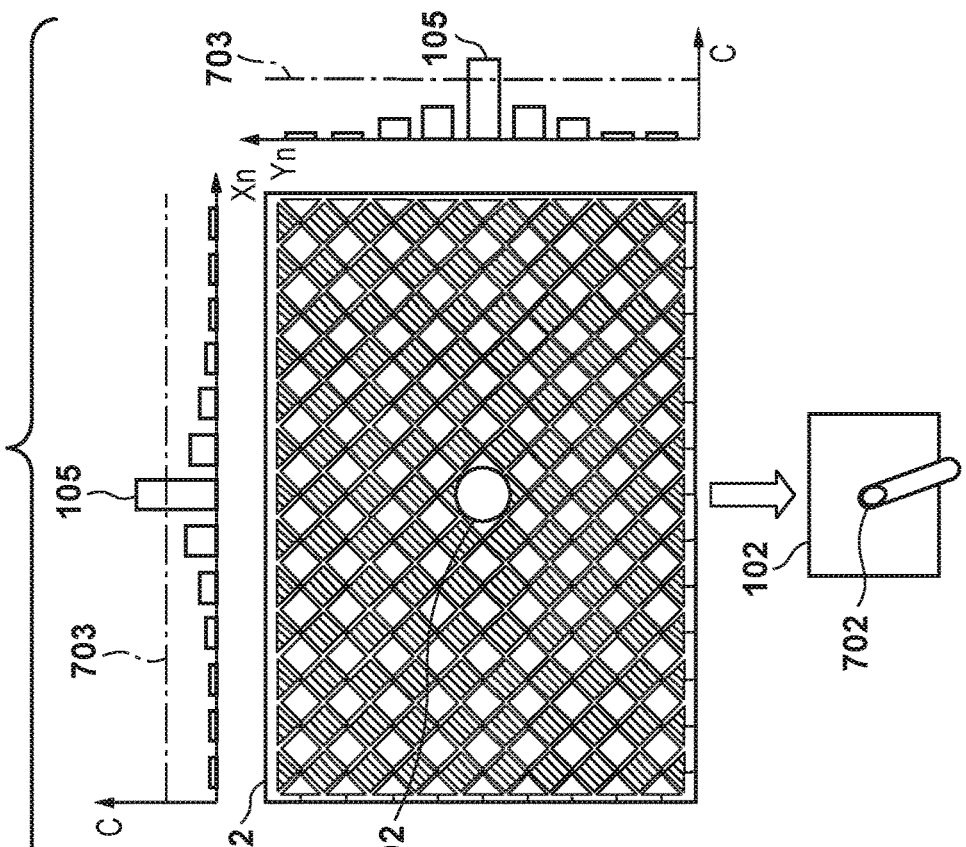
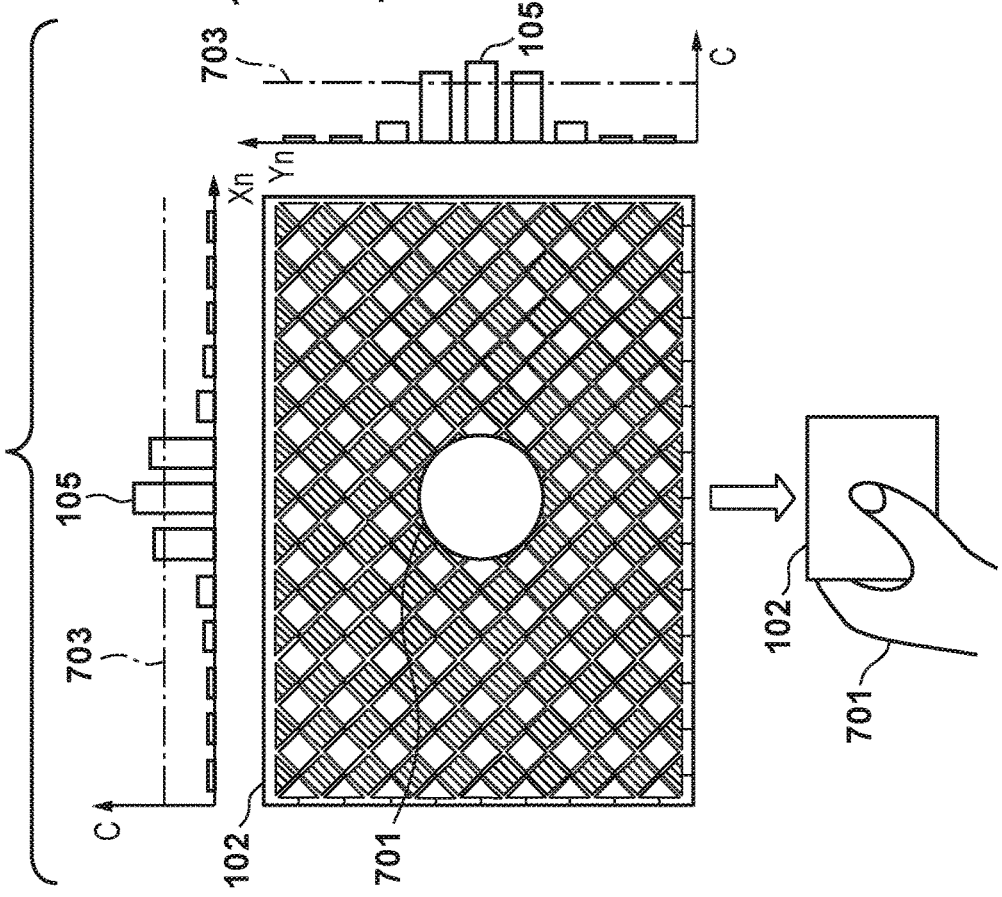

FIG. 8

| 801 | | TOUCH APPROACH DIRECTION | | | | | |
|---|---|---|---|---|---|---|---|
| CONDITION-CHANGE TARGET DIRECTION | | FROM DOWN | FROM LOWER LEFT | FROM LEFT | FROM UPPER LEFT | FROM UP | FROM UPPER RIGHT | FROM RIGHT | FROM LOWER RIGHT |
| | LARGE TOUCH REGION | UPWARD | LEFTWARD, RIGHTWARD | RIGHTWARD | LEFTWARD, RIGHTWARD | DOWNWARD | LEFTWARD, RIGHTWARD | LEFTWARD | LEFTWARD, RIGHTWARD |
| | SMALL TOUCH REGION | UPWARD | / | RIGHTWARD | / | DOWNWARD | / | LEFTWARD | / |

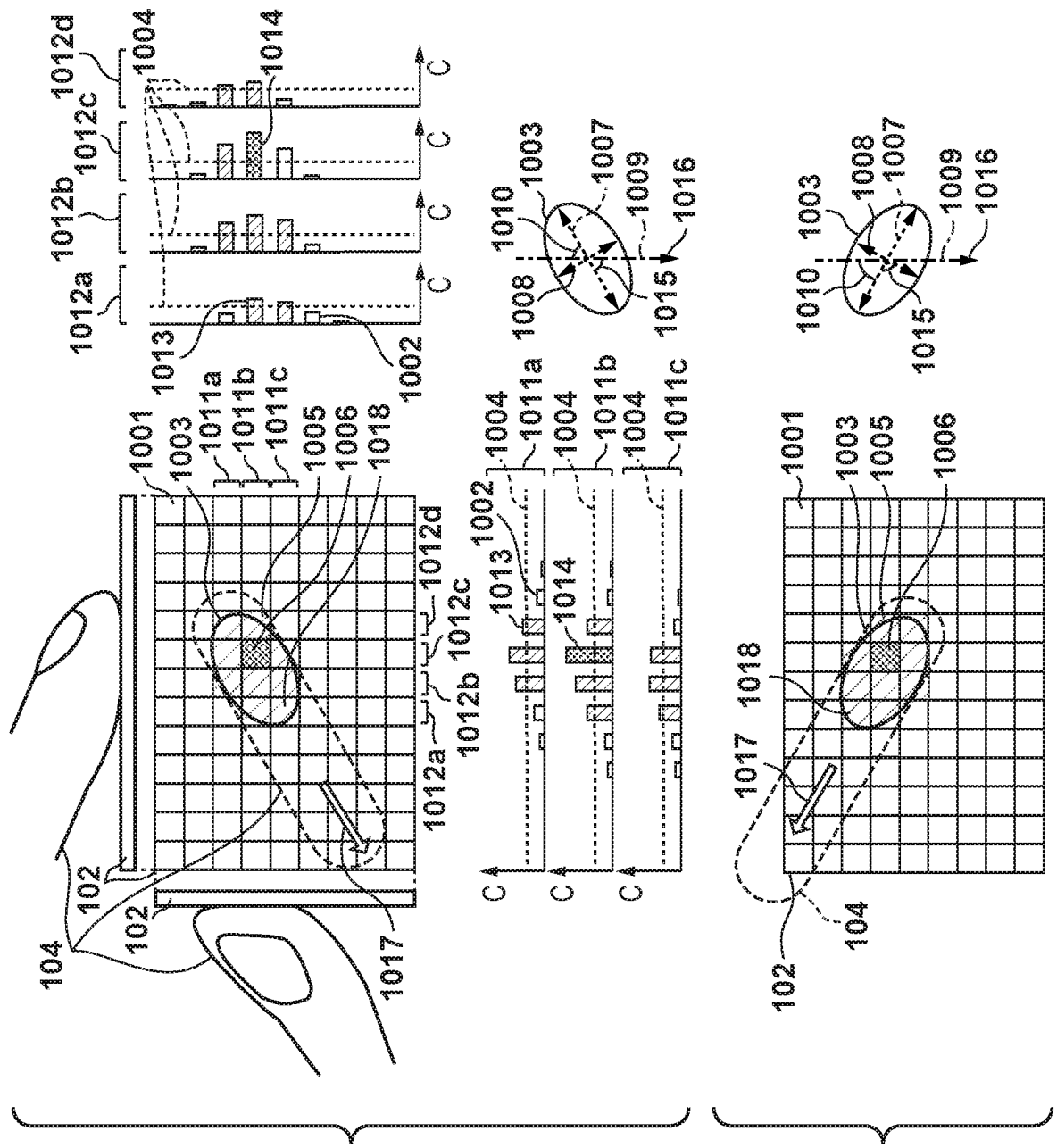

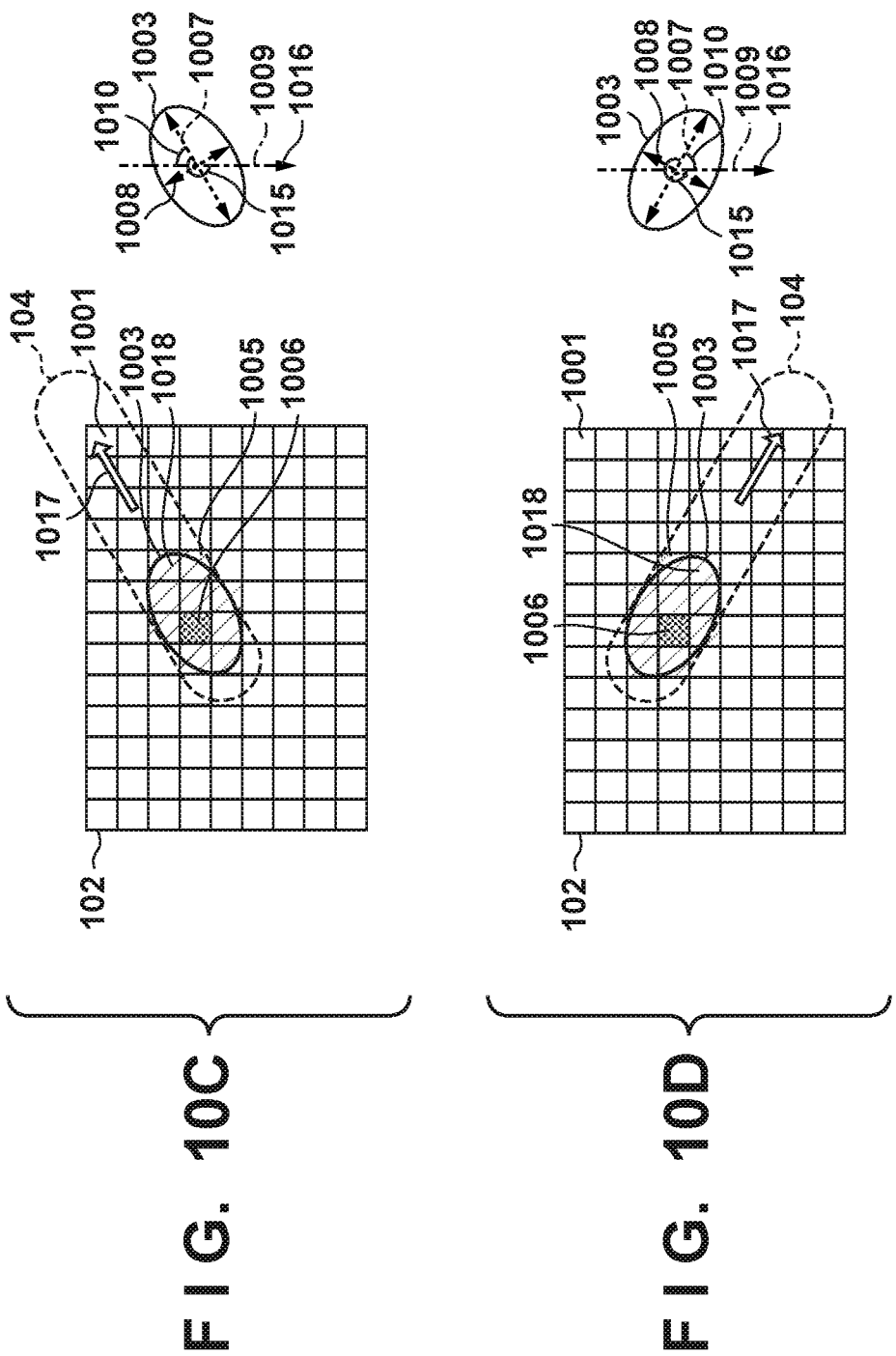

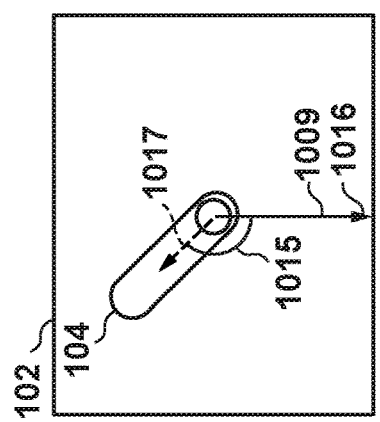
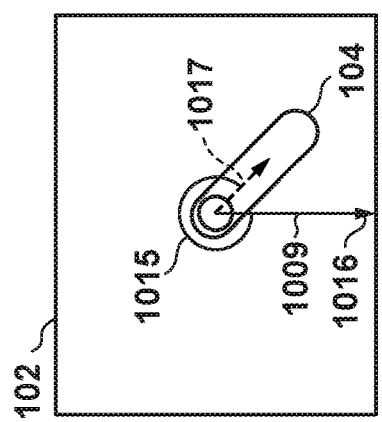
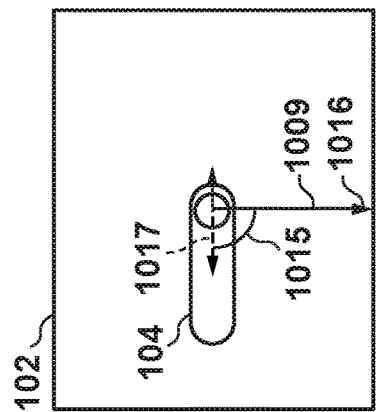
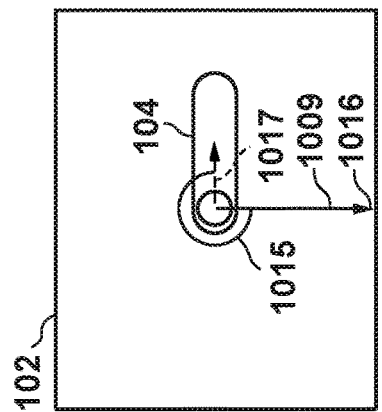
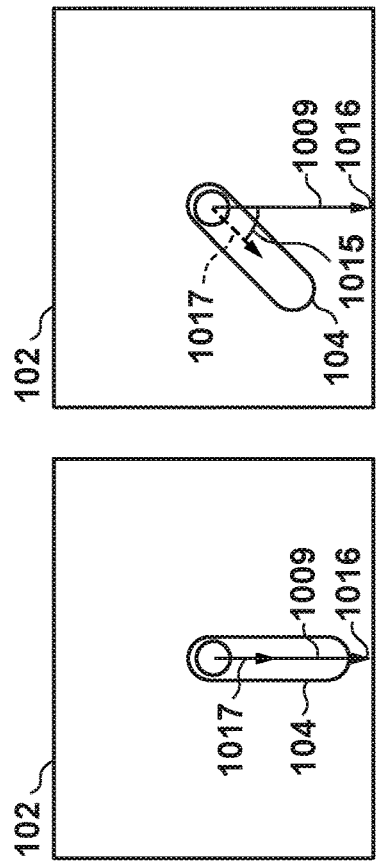
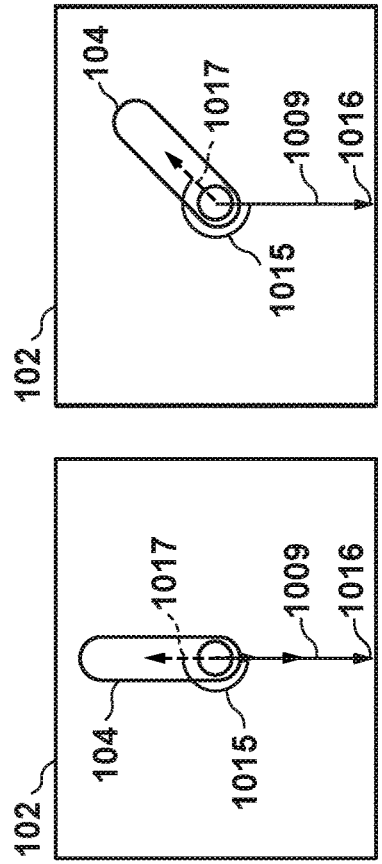

F I G. 12

| 1201 | 0°~10° 350°~360° | 10°~80° | 80°~100° | 100°~170° | 170°~190° | 190°~260° | 260°~280° | 280°~350° |
|---|---|---|---|---|---|---|---|---|
| CONDITION-CHANGE TARGET DIRECTION | UPWARD | LEFTWARD, RIGHTWARD | RIGHTWARD | LEFTWARD, RIGHTWARD | DOWNWARD | LEFTWARD, RIGHTWARD | LEFTWARD | LEFTWARD, RIGHTWARD |●
| | | | | TOUCH INPUT ANGLE WITH RESPECT TO TOUCHSCREEN IN-PLANE AXIS | | | | |

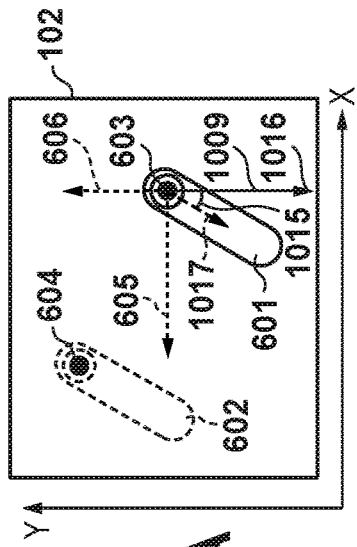
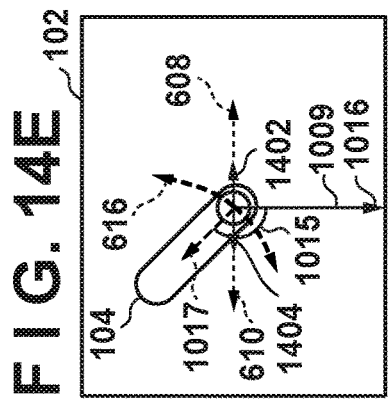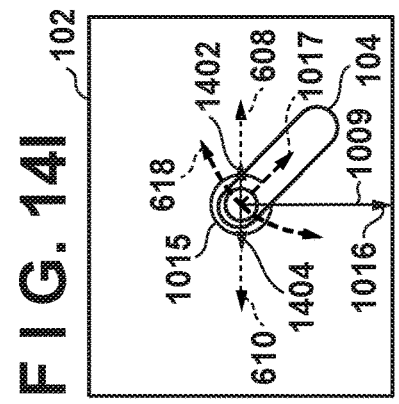
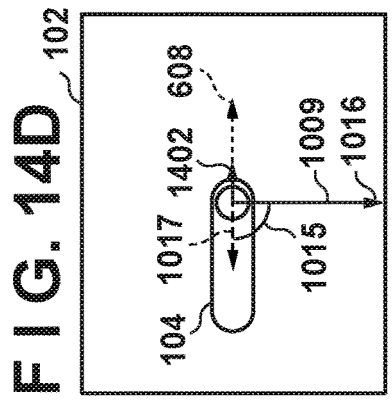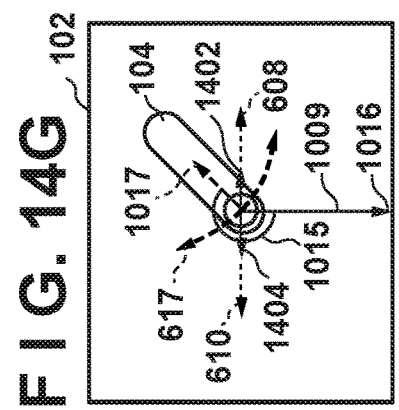
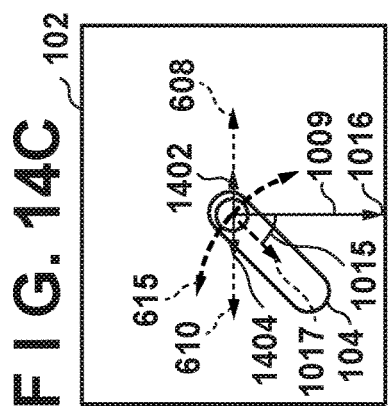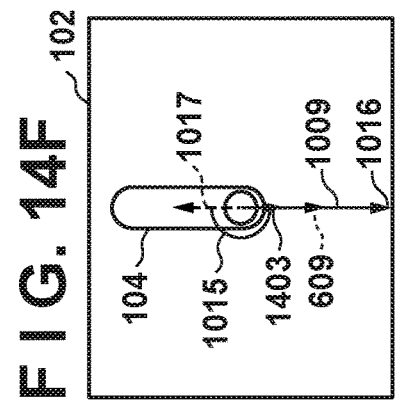
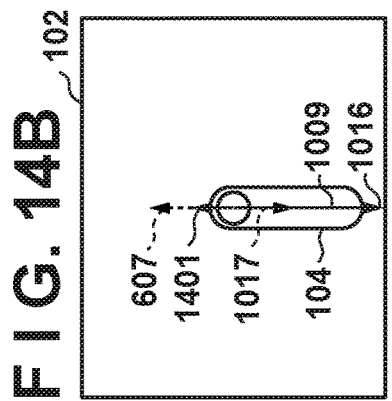

F I G. 15

| 1501 | | 0°~10° 350°~360° | 10°~80° | 80°~100° | 100°~170° | 170°~190° | 190°~260° | 260°~280° | 280°~350° |
|---|---|---|---|---|---|---|---|---|---|
| | | | | TOUCH INPUT ANGLE WITH RESPECT TO TOUCHSCREEN IN-PLANE AXIS | | | | | |
| CONDITION-CHANGE TARGET DIRECTION | LARGE TOUCH REGION | UPWARD | LEFTWARD, RIGHT-WARD | RIGHT-WARD | LEFTWARD, RIGHT-WARD | DOWN-WARD | LEFTWARD, RIGHT-WARD | LEFTWARD | LEFTWARD, RIGHT-WARD |
| | SMALL TOUCH REGION | UPWARD | | RIGHT-WARD | | DOWN-WARD | | LEFTWARD | |

ELECTRONIC APPARATUS AND CONTROL METHOD THEREOF

BACKGROUND OF THE INVENTION

Field of the Invention

The present invention relates to a technique for determining an operation performed on a touchscreen.

Description of the Related Art

Many electronic apparatuses, such as smartphones and digital cameras, are equipped with touchscreens, and can perform control in accordance with a trajectory of a touch position formed by moving a finger or stylus while the finger or stylus is in contact with the touchscreens. Specifically, an operating amount and an operating direction are determined from a trajectory of a moved touch position, and when a predetermined condition is satisfied, it is determined that a touch operation has been performed and control allocated thereto is executed.

Conventionally, an operating direction and an operating amount are determined under the same condition, regardless of the form of a touch operation (an operating direction (operating angle), inclination, and operating amount of a finger or stylus); thus, there are cases in which some forms of touch operations are difficult to perform. For this reason, there is a possibility that a touch operation is not determined accurately and a function intended by a user is not executed.

In view of this problem, Japanese Patent Laid-Open No. 2011-134260 describes changing of a touch operation determination condition based on the history of touchscreen operations. On the other hand, Japanese Patent Laid-Open No. 2013-080999 describes changing of a determination condition for control to be executed based on the way of gripping an apparatus, an operating direction on a touchscreen, and a display image.

In the above-referenced Japanese Patent Laid-Open No. 2011-134260, as the touch operation determination condition is changed based on the history of touchscreen operations, the same touchscreen operation needs to be performed multiple times, and a single touchscreen operation is not dealt with. On the other hand, the above-referenced Japanese Patent Laid-Open No. 2013-080999 is disadvantageous in terms of cost because, due to the premise that the way of gripping the apparatus needs to be identified, a sensor for recognizing the way of gripping the apparatus is required.

SUMMARY OF THE INVENTION

The present invention has been made in consideration of the aforementioned problems, and realizes, at low cost, an apparatus that can accurately determine a touch operation intended by a user regardless of the form of the touch operation.

In order to solve the aforementioned problems, the present invention provides an electronic apparatus, comprising: a touch detection unit configured to detect a touch operation performed on an operation surface by an operation body; a determination unit configured to, on an occurrence of a move operation in which the operation body moves while in contact with the operation surface, determine an operating direction of the move operation under a determination condition that varies according to an approach direction of the operation body toward the operation surface; and a control unit configured to perform control to execute a function corresponding to the operating direction determined by the determination unit.

In order to solve the aforementioned problems, the present invention provides an electronic apparatus, comprising: a touch detection unit configured to detect a touch operation performed on an operation surface by an operation body; a determination unit configured to, on an occurrence of a move operation in which the operation body moves while in contact with the operation surface, determine an operating direction of the move operation under a determination condition that varies according to an inclined state of the operation body with respect to the operation surface; and a control unit configured to perform control to execute a function corresponding to the operating direction determined by the determination unit.

In order to solve the aforementioned problems, the present invention provides an electronic apparatus, comprising: a touch detection unit configured to detect a touch operation performed on an operation surface by an operation body, the touch detection unit being a capacitance-type touch sensor; a determination unit configured to, on an occurrence of a move operation in which the operation body moves while in contact with the operation surface, determine an operating direction of the move operation under a determination condition that varies according to a distribution of capacitances generated due to proximity of the operation body that has performed the move operation to the operation surface; and a control unit configured to perform control to execute a function corresponding to the operating direction determined by the determination unit.

In order to solve the aforementioned problems, the present invention provides an electronic apparatus, comprising: a touch detection unit configured to detect a touch operation performed on an operation surface by an operation body; a determination unit configured to, on an occurrence of a move operation in which the operation body moves while in contact with the operation surface, determine an operating direction of the move operation under a determination condition that varies according to a touch input angle of the operation body on the operation surface with respect to a predetermined direction along the operation surface; and a control unit configured to perform control to execute a function corresponding to the operating direction determined by the determination unit.

In order to solve the aforementioned problems, the present invention provides a control method of an electronic apparatus having a touch detection unit configured to detect a touch operation performed on an operation surface by an operation body, the method comprising: on an occurrence of a move operation in which the operation body moves while in contact with the operation surface, determining an operating direction of the move operation under a determination condition that varies according to an approach direction of the operation body toward the operation surface; and performing control to execute a function corresponding to the determined operating direction.

In order to solve the aforementioned problems, the present invention provides a control method of an electronic apparatus having a touch detection unit configured to detect a touch operation performed on an operation surface by an operation body, the method comprising: on an occurrence of a move operation in which the operation body moves while in contact with the operation surface, determining an operating direction of the move operation under a determination condition that varies according to an inclined state of the operation body with respect to the operation surface; and performing control to execute a function corresponding to the determined operating direction.

In order to solve the aforementioned problems, the present invention provides a control method of an electronic apparatus having a touch detection unit configured to detect a touch operation performed on an operation surface by an operation body, the touch detection unit being a capacitance-type touch sensor, the method comprising: on an occurrence of a move operation in which the operation body moves while in contact with the operation surface, determining an operating direction of the move operation under a determination condition that varies according to a distribution of capacitances generated due to proximity of the operation body that has performed the move operation to the operation surface; and performing control to execute a function corresponding to the determined operating direction.

In order to solve the aforementioned problems, the present invention provides a control method of an electronic apparatus having a touch detection unit that detects a touch operation performed on an operation surface by an operation body, the method comprising: on an occurrence of a move operation in which the operation body moves while in contact with the operation surface, determining an operating direction of the move operation under a determination condition that varies according to a touch input angle of the operation body on the operation surface with respect to a predetermined direction along the operation surface; and performing control to execute a function corresponding to the determined operating direction.

In order to solve the aforementioned problems, the present invention provides a non-transitory computer-readable storage medium storing a program for causing a computer to function as a determination unit and a control unit of an electronic apparatus having a touch detection unit configured to detect a touch operation performed on an operation surface by an operation body, wherein the determination unit, on an occurrence of a move operation in which the operation body moves while in contact with the operation surface, determines an operating direction of the move operation under a determination condition that varies according to an approach direction of the operation body toward the operation surface, and the control unit performs control to execute a function corresponding to the operating direction determined by the determination unit.

In order to solve the aforementioned problems, the present invention provides a non-transitory computer-readable storage medium storing a program for causing a computer to function as a determination unit and a control unit of an electronic apparatus having a touch detection unit configured to detect a touch operation performed on an operation surface by an operation body, wherein the determination unit, on an occurrence of a move operation in which the operation body moves while in contact with the operation surface, determines an operating direction of the move operation under a determination condition that varies according to an inclined state of the operation body with respect to the operation surface, and the control unit performs control to execute a function corresponding to the operating direction determined by the determination unit.

In order to solve the aforementioned problems, the present invention provides a non-transitory computer-readable storage medium storing a program for causing a computer to function as a determination unit and a control unit of an electronic apparatus having a touch detection unit configured to detect a touch operation performed on an operation surface by an operation body, using a capacitance-type touch sensor, wherein the determination unit, on an occurrence of a move operation in which the operation body moves while in contact with the operation surface, determines an operating direction of the move operation under a determination condition that varies according to a distribution of capacitances generated due to proximity of the operation body that has performed the move operation to the operation surface, and the control unit performs control to execute a function corresponding to the operating direction determined by the determination unit.

In order to solve the aforementioned problems, the present invention provides a non-transitory computer-readable storage medium storing a program for causing a computer to function as a determination unit and a control unit of an electronic apparatus having a touch detection unit configured to detect a touch operation performed on an operation surface by an operation body, wherein the determination unit, on an occurrence of a move operation in which the operation body moves while in contact with the operation surface, determines an operating direction of the move operation under a determination condition that varies according to a touch input angle of the operation body on the operation surface with respect to a predetermined direction along the operation surface, and the control unit performs control to execute a function corresponding to the operating direction determined by the determination unit.

The present invention can realize, at low cost, an apparatus that can accurately determine a touch operation intended by a user regardless of the form of the touch operation.

Further features of the present invention will become apparent from the following description of exemplary embodiments (with reference to the attached drawings).

BRIEF DESCRIPTION OF THE DRAWINGS

FIGS. 3A to 3J are diagrams for describing a method of estimating an inclination angle of the touch operation member and a method of determining a touch approach direction of the same according to the first embodiment.

FIG. 4 exemplarily shows a selection table according to the first embodiment, indicating a condition-change target direction for each variety of the touch approach direction.

FIGS. 6A to 6I are diagrams for describing specific examples of the processing for controlling a touch operation determination condition shown in FIGS. 5A to 5C.

FIGS. 7A and 7B are diagrams for describing a method of determining the size of a touch region according to a second embodiment.

FIG. 8 exemplarily shows a selection table according to the second embodiment, indicating a condition-change target direction for each variety of a touch approach direction in consideration of the size of a touch region.

FIGS. 10A to 10D are diagrams for describing processing for determining a touch input angle with respect to a touchscreen in-plane axis according to a third embodiment.

FIGS. 11A to 11H are diagrams for describing specific examples of the processing for determining the touch input angle shown in FIGS. 10A to 10D.

FIG. 12 exemplarily shows a selection table according to the third embodiment, indicating a condition-change target direction for each range of the touch input angle with respect to the touchscreen in-plane axis.

FIGS. 14A to 14I are diagrams for describing specific examples of the processing for controlling a touch operation determination condition in the third embodiment.

FIG. 15 exemplarily shows a selection table according to a fourth embodiment, indicating a condition-change target direction for each range of a touch input angle.

DESCRIPTION OF THE EMBODIMENTS

With reference to the attached drawings, the following provides a detailed description of embodiments in which an electronic apparatus of the present invention is applied to, for example, a smartphone or a tablet including a touchscreen-equipped display unit.

<Apparatus Configuration>

Figure 1:
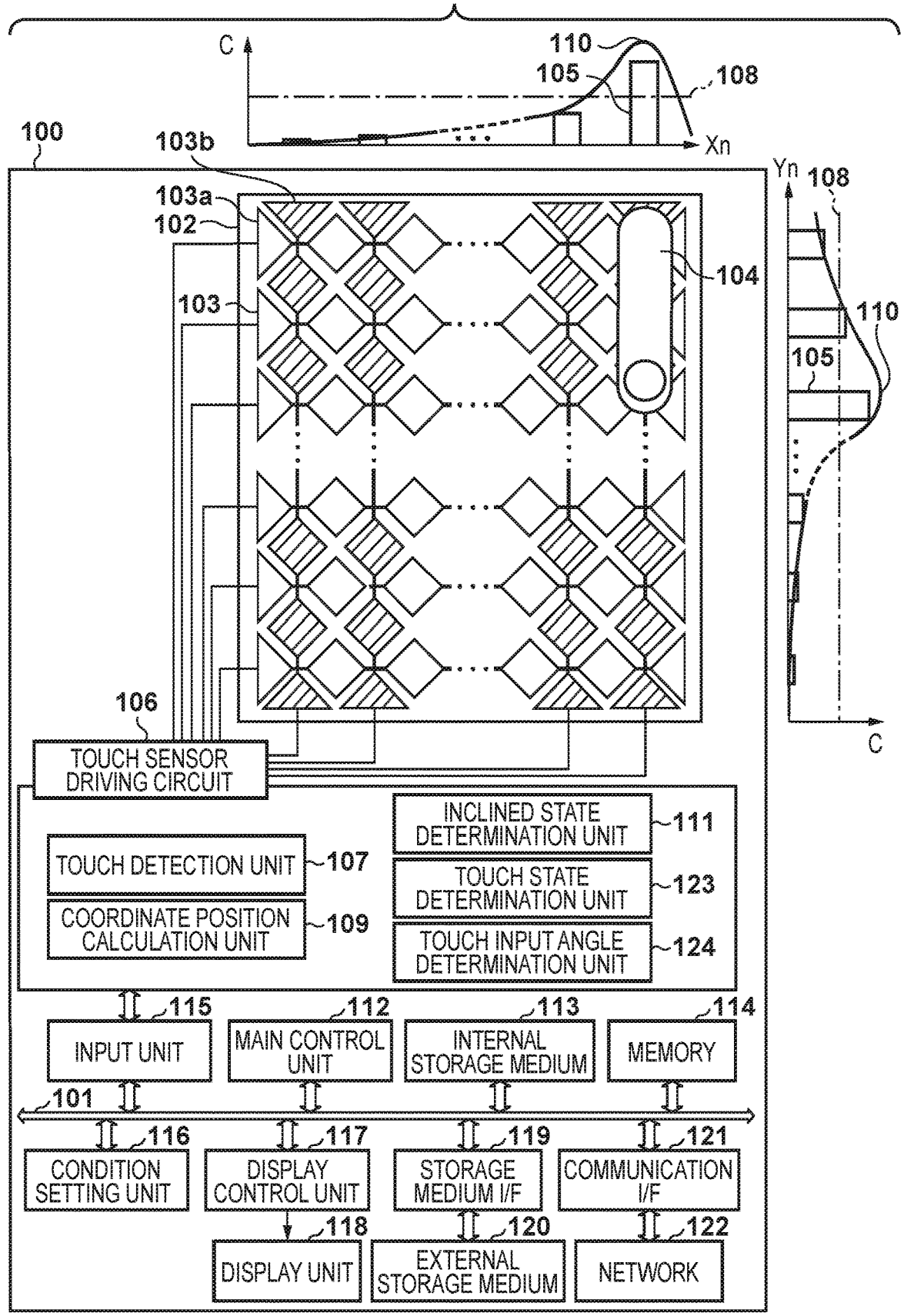
FIG. 1 is a block diagram showing a configuration of a touchscreen-equipped electronic apparatus according to the embodiments.

A description is now given of a configuration and functions of an electronic apparatus 100 according to the present embodiments with reference to FIG. 1.

A main control unit 112, an internal storage medium 113, a memory 114, an input unit 115, a condition setting unit 116, a display control unit 117, a storage medium I/F 119, and a communication I/F 121 are connected to an internal bus 101, and can exchange data with one another via the internal bus 101.

For example, as shown in FIG. 1, a touchscreen 102 includes capacitance-type touch sensors 103, which are composed of touch sensors (sensor electrodes) 103a, 103b arranged two-dimensionally, and generates capacitances C between itself and a touch operation member 104 (an operation body), which is a finger, a stylus, or a similar conductive element. Note that the touch sensors 103 are not limited to having the shape of a rhombus. Among the touch sensors 103, horizontal axis direction sensors 103a generate capacitances during a touch operation in the X-axis direction (horizontal direction) in the figure, whereas vertical axis direction sensors 103b generate capacitances during a touch operation in the Y-axis direction (vertical direction) in the figure. In an example shown in the figure, generated capacitances C represent capacitances between the horizontal axis direction sensors 103a or the vertical axis direction sensors 103b and GND; alternatively, capacitances between the horizontal axis direction sensors 103a and the vertical axis direction sensors 103b may be detected.

A touch sensor driving circuit 106 includes a touch detection unit 107, a coordinate position calculation unit 109, an inclined state determination unit 111, a touch input angle determination unit 124, and a touch state determination unit 123. The touch detection unit 107 determines whether a touch operation has been performed by comparing generated capacitance of each sensor 103a, 103b (or inter-sensor capacitance) C with a touch detection threshold 108; for example, it determines that a touch operation has been performed when generated capacitance 105 is larger than the touch detection threshold 108. The coordinate position calculation unit 109 calculates the coordinates of a touch position by calculating, for example, the center of mass 110 from generated capacitance C detected by each sensor 103a, 103b. Note that when the touch sensors 103 are arranged in three or more dimensions, the center of mass 110 is calculated for each of the depth-, width-, and height-axis directions. The inclined state determination unit 111 determines an inclined state of the touch operation member 104 that has performed a touch operation with respect to a touchscreen surface (inclination determination), using capacitances C generated by touch sensors when the touch detection unit 107 determines that the touch operation has been performed. The touch input angle determination unit 124 determines a touch input angle of the touch operation member 104 with respect to a predetermined axis in a direction along the touchscreen surface (a touchscreen in-plane axis) (touch input angle determination), using inter-sensor capacitances C generated by touch sensors when the touch detection unit 107 determines that a touch operation has been performed. The touch state determination unit 123 determines a direction of a touch operation and a size of a touch region from the distribution of capacitances C generated by touch sensors when the touch detection unit 107 determines that the touch operation has been performed, and from the results of determination by the inclined state determination unit 111 and the touch input angle determination unit 124.

The main control unit 112 includes a CPU/MPU that performs integrated control over the entire electronic apparatus 100.

The internal storage medium 113 is a hard disk or a memory card that stores, for example, data, such as image data, and later-described programs executed by the main control unit 112.

The memory 114 is, for example, a RAM, and the main control unit 112 controls various components of the electronic apparatus 100 by deploying programs stored in the internal storage medium 113 to the memory 114, which serves as a working memory, and executing the deployed programs. Note that programs related to the actions of the main control unit 112 are not limited to being stored in the internal storage medium 113; they may be prestored in, for example, an EEPROM or a similar nonvolatile memory.

The input unit 115 accepts a touch operation performed on the touchscreen 102 by the touch operation member 104, generates a detection signal corresponding to capacitances C generated during the touch operation, and outputs the detection signal to the main control unit 112 and the later-described condition setting unit 116.

Based on the detection signal output from the input unit 115, the condition setting unit 116 changes, for example, a moving distance threshold as a later-described touch operation determination condition in accordance with, for example, an approach direction, an inclination angle, and a touch input angle of the touch operation member 104.

The main control unit 112 controls various components of the electronic apparatus 100 based on the detection signal, which is output from the input unit 115 in accordance with a touch operation performed on the touchscreen 102, and the touch operation determination condition set by the condition setting unit 116. This enables the electronic apparatus 100 to execute processing corresponding to a user operation.

The display control unit 117 generates a display signal for displaying images based on a display control signal from the main control unit 112, and outputs the display signal to a display unit 118. The display control unit 117 thus causes the display unit 118 to display a graphical user interface (GUI) screen in accordance with, for example, the display control signal from the main control unit 112.

Note that the touchscreen 102 and the display unit 118 may be formed integrally. In this case, for example, the touchscreen 102 is configured in such a manner that its light transmittance does not obstruct a display performance by the display unit 118, and is mounted over a display surface of the display unit 118. Furthermore, touch input coordinates on the touchscreen 102 are associated with display coordinates on the display unit 118. In this way, a GUI can be configured that enables a user to directly operate a screen displayed on the display unit 118.

An external storage medium 120, such as a memory card, is attachable to and detachable from the storage medium I/F 119, and the storage medium I/F 119 reads out data from and writes data to the external storage medium 120 based on a control signal from the main control unit 112. Note that the external storage medium 120 is not limited to the memory card and the like; it may be an optical disc, such as a CD, DVD, and Blu-ray Disc.

Based on a control signal from the main control unit 112, the communication I/F 121 connects to a wireless or wired network 122, such as a LAN and the Internet, to communicate with a server and an external apparatus.

Note that the main control unit 112 can detect the following operations/states on an operation surface of the touchscreen 102.

Placing a finger or stylus on the touchscreen 102 from a state in which nothing was in contact with the touchscreen 102 (that is to say, a start of a touch). This operation is referred to as a touch-down.

A state in which a finger or stylus is in contact with the touchscreen 102. This is referred to as a touch-on.

Moving a finger or stylus while it is in contact with the touchscreen 102. This operation is referred to as a touch-move (touch-move operation).

Releasing contact between the touchscreen 102 and a finger or stylus (that is to say, an end of a touch). This operation is referred to as a touch-up.

A state in which nothing is in contact with the touchscreen 102. This is referred to as a touch-off.

When a touch-down is detected, a touch-on is also detected simultaneously. Normally, after a touch-down, a touch-on is continuously detected unless a touch-up is detected. A touch-move is detected also while a touch-on is being detected. While a touch-on is being detected, a touch-move is not detected if a touch position does not move. A touch-off is detected upon detection of a touch-up, that is to say, releasing of contact between the touchscreen 102 and all fingers or a stylus. In order to prevent a minute movement caused by, for example, shaking of a finger from being erroneously detected as a touch-move, a movement equal to or larger than a threshold is determined as a touch-move. In the embodiments to be described later, this moving distance threshold for determining that a touch-move has been performed is changed for each touch-move direction, in accordance with an approach direction of a touching finger or stylus (a moving direction of, for example, the base of the finger or the end of the stylus opposite to a touch position).

The main control unit 112 is notified of the aforementioned operations/states on the touchscreen 102, as well as the position coordinates on the touchscreen 102 that are touched by a finger or stylus, via the internal bus 101. The main control unit 112 determines what kind of operation has been performed on the touchscreen 102 based on information that it has been notified of. With regard to a touch-move, a moving direction of a finger or stylus moving on the touchscreen 102 can be determined separately for a vertical component and a horizontal component on the touchscreen 102 based on changes in the position coordinates. When a touch-down, a certain touch-move, and a touch-up are successively performed in this order on the touchscreen 102, it is determined that a stroke has been performed. An operation of quickly performing a stroke is called a flick. A flick is an operation whereby a finger or stylus is quickly moved by a certain distance while in contact with the touchscreen 102 and then released from the touchscreen 102; in other words, a flick is an operation of quickly flicking on the touchscreen 102 with a finger. It is determined that a flick has been performed when a touch-up is detected immediately after detection of a touch-move of a predetermined distance or longer at a predetermined speed or higher.

In the embodiments to be described later, this predetermined distance set for a flick (a distance threshold for determining that a flick has been performed) is changed for each touch-move direction, in accordance with an approach direction of a touching finger or stylus. Furthermore, it is determined that a drag has been performed when a touch-move of a predetermined distance or longer at a speed lower than a predetermined speed is detected.

The following describes touch operation determination processing according to the embodiments of the present invention with reference to FIGS. 2A to 16.

[First Embodiment]

The present embodiment involves processing for determining an approach direction (touch approach direction) of the touch operation member 104 that has performed a touch operation in accordance with an inclined state of the touch operation member 104 with respect to the touchscreen surface, and changing a touch operation determination condition based on the touch approach direction.

First, a method of determining an inclined state of the touch operation member 104 according to the present embodiment will be described with reference to FIGS. 2A to 2F.

A touch sensor 201 is a sensor that generates the largest capacitance 205 (a largest capacitance sensor).

Touch sensors 202, 203 are sensors that are adjacent to the periphery of the largest capacitance sensor 201 (adjacent sensors).

A difference value 204 is obtained by subtracting the capacitance 206 generated by the adjacent sensor 202 from the capacitance 205 generated by the largest capacitance sensor 201. A difference value 207 is obtained by subtracting the capacitance 208 generated by the adjacent sensor 203 from the capacitance 205 generated by the largest capacitance sensor 201. Note that the difference values 204 and 207 are both referred to as difference values A.

A first threshold 209 is a determination criterion that is set for the difference values 204, 207 to determine whether there is a possibility of that the touch operation member 104 is inclined.

A touch sensor 210 is a different sensor (distant sensor) that is not adjacent to the largest capacitance sensor 201 but is adjacent to the adjacent sensor 202 or 203.

A difference value 211 is obtained by subtracting the capacitance 212 generated by the distant sensor 210 from the capacitance 206 generated by the adjacent sensor 202. Note that the difference value 211 is referred to as a difference value B.

A second threshold 213 is a determination criterion that is set for the difference value 211 to determine whether there is a possibility that the touch operation member 104 is inclined.

A third threshold 214 is a determination criterion that is set for the capacitance 208 generated by the adjacent sensor 203 to determine whether there is a possibility that the touch operation member 104 is inclined.

A fourth threshold 215 is a determination criterion that is set for the capacitance 208 generated by the adjacent sensor 203 to determine whether there is a possibility that the touch operation member 104 is inclined.

Figure 2A:
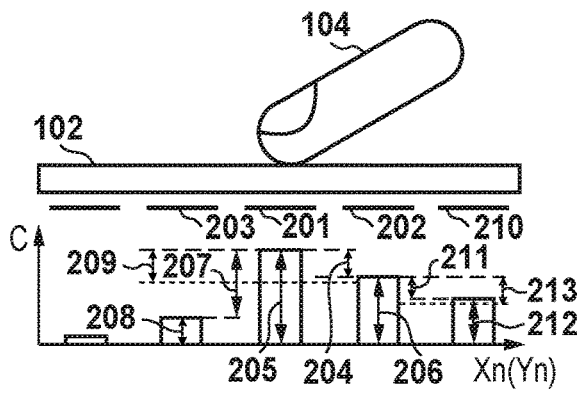
FIGS. 2A to 2F are diagrams for describing a method of determining an inclined state of a touch operation member according to a first embodiment.
Figure 2B:
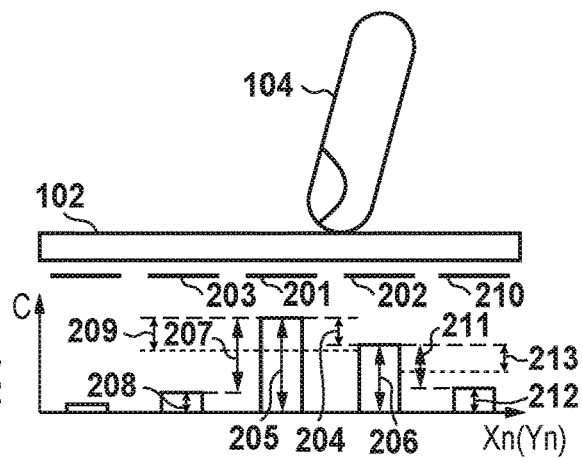
Figure 2C:
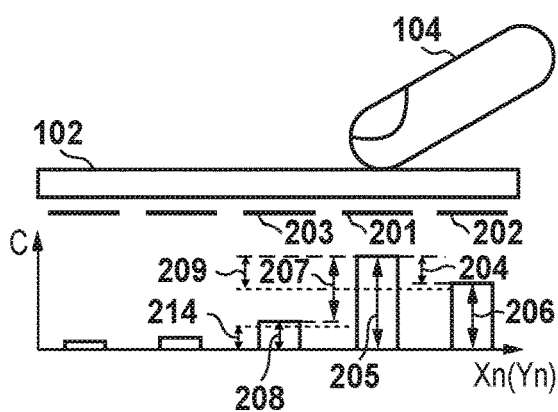
Figure 2D:
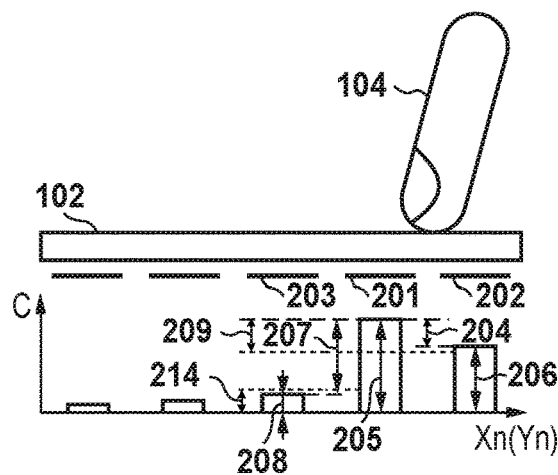
Figure 2E:
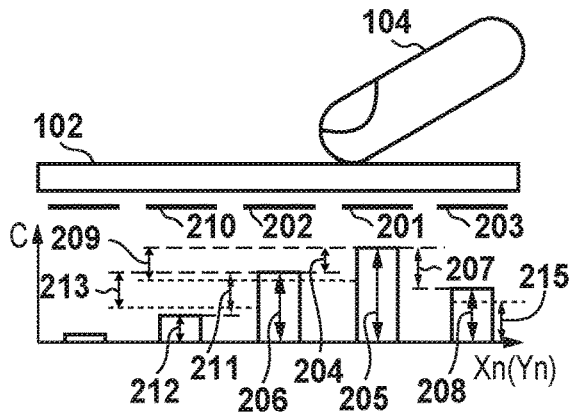
Figure 2F:
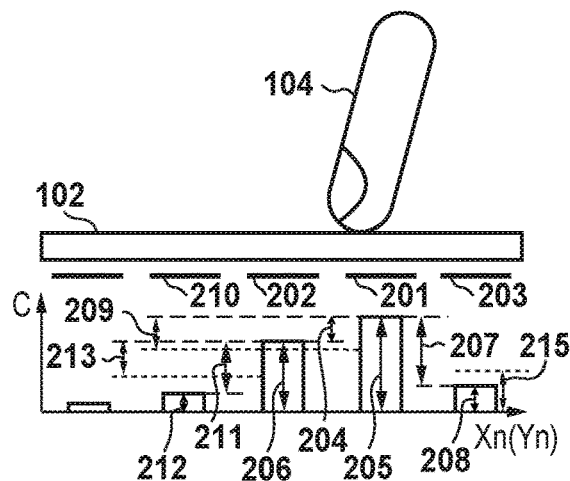

FIGS. 2A, 2C, and 2E show examples of the distribution of capacitances C that are generated due to the proximity of the operation body when the touch operation member 104 is determined to be inclined. FIGS. 2B, 2D, and 2F show examples of the distribution of capacitances C that are generated due to the proximity of the operation body when the touch operation member 104 is not determined to be inclined.

When the touch operation member 104 is inclined, the difference values of generated capacitances C from a distal portion of the touch operation member 104 (corresponding to the largest capacitance sensor 201) to a proximal portion thereof (corresponding to the adjacent sensor 202 or 203 and the distant sensor 210) are small. In contrast, when the touch operation member 104 is not inclined, the difference values of generated capacitances C at the periphery of the touch operation member 104 (corresponding to the adjacent sensor 202 or 203) and the proximal portion thereof (corresponding to the distant sensor 210) are large.

With reference to FIGS. 3A to 3J, a description is now given of a method of estimating an inclination angle of the touch operation member 104 that has performed a touch operation and a method of determining a touch approach direction of the same according to the present embodiment.

Touch sensors 301, 302 are inclination-side sensors that are located along the direction of inclination of the touch operation member 104 relative to the largest capacitance sensor 201.

A difference value 303 is obtained by subtracting the capacitance 305 generated by the inclination-side sensor 301 from the capacitance 205 generated by the largest capacitance sensor 201. A difference value 304 is obtained by subtracting the capacitance 306 generated by the inclination-side sensor 302 from the capacitance 205 generated by the largest capacitance sensor 201.

An inclination angle 307 is an angle formed by the touch operation member 104 and the touchscreen 102. Note that the angle may be replaced with any index that indicates the extent of inclination. The inclination angle 307 is also referred to as an inclination angle θ.

A fifth threshold 308 is a determination criterion that is set for the inclination angle 307 to determine whether there is a possibility that the touch operation member 104 is inclined to the extent that the determination of the touch approach direction is affected.

Figure 3A:
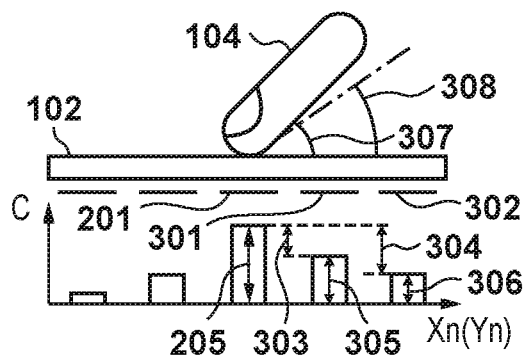

FIG. 3A exemplarily shows the distribution of capacitances C when the inclination angle θ of the touch operation member 104 is large (the inclination angle 307 is larger than the fifth threshold 308).

Figure 3B:
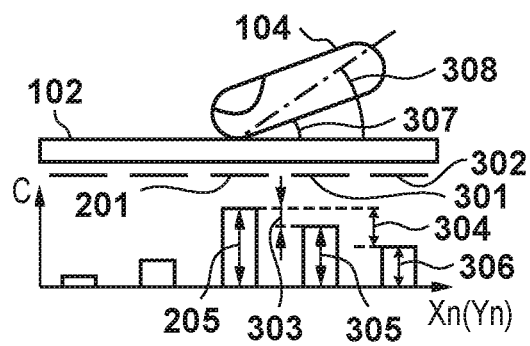

FIG. 3B exemplarily shows the distribution of capacitances C when the inclination angle θ of the touch operation member is small (the inclination angle 307 is smaller than the fifth threshold 308).

FIGS. 3C to 3J show specific examples of a touch approach direction that is determined when the inclination angle θ of the touch operation member 104 is large (see FIG. 3A). It will be assumed that the touch sensors 103 are arranged two-dimensionally along the display surface of the display unit 118. For the sake of explanation, it will also be assumed that the touch approach direction is from one of the following eight directions: up, down, left, right, and four diagonal directions. The touch approach direction is determined as follows, separately for an X-axis (horizontal) direction component and a Y-axis (vertical) direction component: when a difference between output values of adjacent sensors that adjacently sandwich the largest capacitance sensor is equal to or larger than a threshold on the occurrence of a touch operation, it is determined that the approach has been made by traversing one of the adjacent sensors with a larger output value. On the other hand, when the difference between the output values of the adjacent sensors that adjacently sandwich the largest capacitance sensor is smaller than the threshold on the occurrence of the touch operation, it is determined that no approach has been made along the corresponding direction component. As described above, the approach direction is determined based on a combination of determination of the approach direction for the X-axis (horizontal) direction component and determination of the approach direction for the Y-axis (vertical) direction component.

Figure 3C:
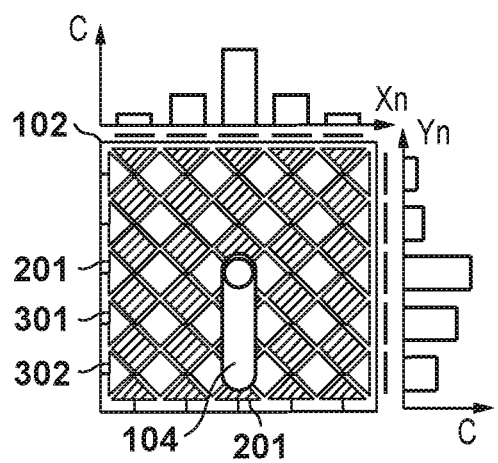

In FIG. 3C, it is determined that the touch approach direction is from down. The X-axis (horizontal) direction component shows that the difference between the output values of the adjacent sensors that adjacently sandwich the largest capacitance sensor is smaller than the threshold; therefore, it is determined that the approach has not been made in the X-axis direction. On the other hand, the Y-axis (vertical) direction component shows that the difference between the output values of the adjacent sensors that adjacently sandwich the largest capacitance sensor is equal to or larger than the threshold, and the adjacent sensor on the lower side has a larger output value; therefore, with respect to the Y-axis direction component, it is determined that the approach has been made from down. Based on a combination of the X-axis component (none) and the Y-axis component (from down), it is determined that the touch approach direction is from down.

Figure 3D:
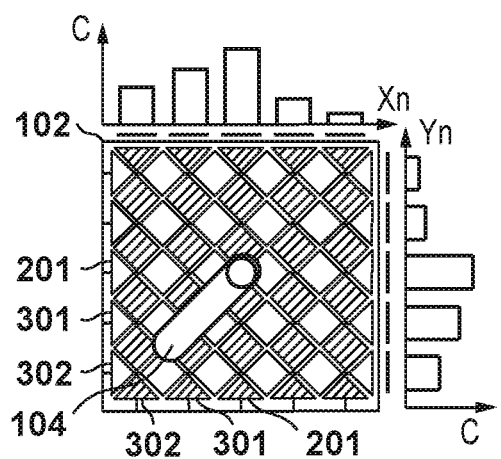

In FIG. 3D, it is determined that the touch approach direction is from lower left. The X-axis (horizontal) direction component shows that the difference between the output values of the adjacent sensors that adjacently sandwich the largest capacitance sensor is equal to or larger than the threshold, and the adjacent sensor on the left has a larger output value; therefore, with respect to the X-axis direction component, it is determined that the approach has been made from left. On the other hand, the Y-axis (vertical) direction component shows that the difference between the output values of the adjacent sensors that adjacently sandwich the largest capacitance sensor is equal to or larger than the threshold, and the adjacent sensor on the lower side has a larger output value; therefore, with respect to the Y-axis direction component, it is determined that the approach has been made from down. Based on a combination of the X-axis component (from left) and the Y-axis component (from down), it is determined that the touch approach direction is from lower left. In subsequent FIGS. 3E to 3J, the touch approach direction is determined using a similar determination method.

Figure 3E:
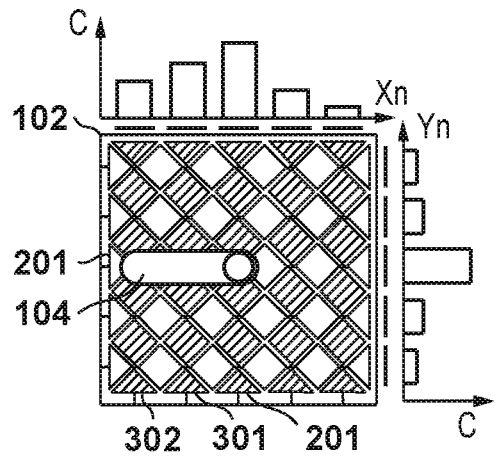
Figure 3F:
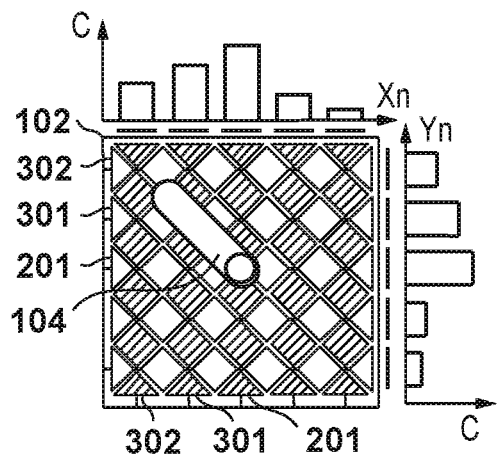

In FIG. 3E, it is determined that the touch approach direction is from left. In FIG. 3F, it is determined that the touch approach direction is from upper left. In FIG. 3G, it is determined that the touch approach direction is from up. In FIG. 3H, it is determined that the touch approach direction is from upper right. In FIG. 3I, it is determined that the touch approach direction is from right. In FIG. 3J, it is determined that the touch approach direction is from lower right.

FIG. 4 exemplarily shows a selection table 401 according to the present embodiment, indicating a direction in which a touch operation determination condition is changed (a condition-change target direction) for each variety of the touch approach direction.

Specifically, the table 401 indicates condition-change target directions (in which determination of an operation is made easy) in one-to-one correspondence with varieties of the touch approach direction. Here, for the sake of simplicity, it will be assumed that four operating directions represented by the upward, downward, leftward, and rightward directions can be determined, and the touch approach direction is from one of the following eight directions: up, down, left, right, and four diagonal directions. For example, when the touch approach direction is from up, a condition for determining that a touch operation for moving downward has been performed is changed (a distance threshold for determining that a downward touch-move or flick has been performed is made smaller than normal). That is to say, whatever the touch approach direction is, a distance threshold for determining that a touch operation (touch-move or flick) for moving in the corresponding condition change target direction has been performed is made smaller than normal, and the resultant distance threshold is smaller than distance thresholds for directions other than the corresponding condition-change target direction. Usage examples of the table 401 will be described later with reference to FIGS. 6A to 6I.

Figure 5A:
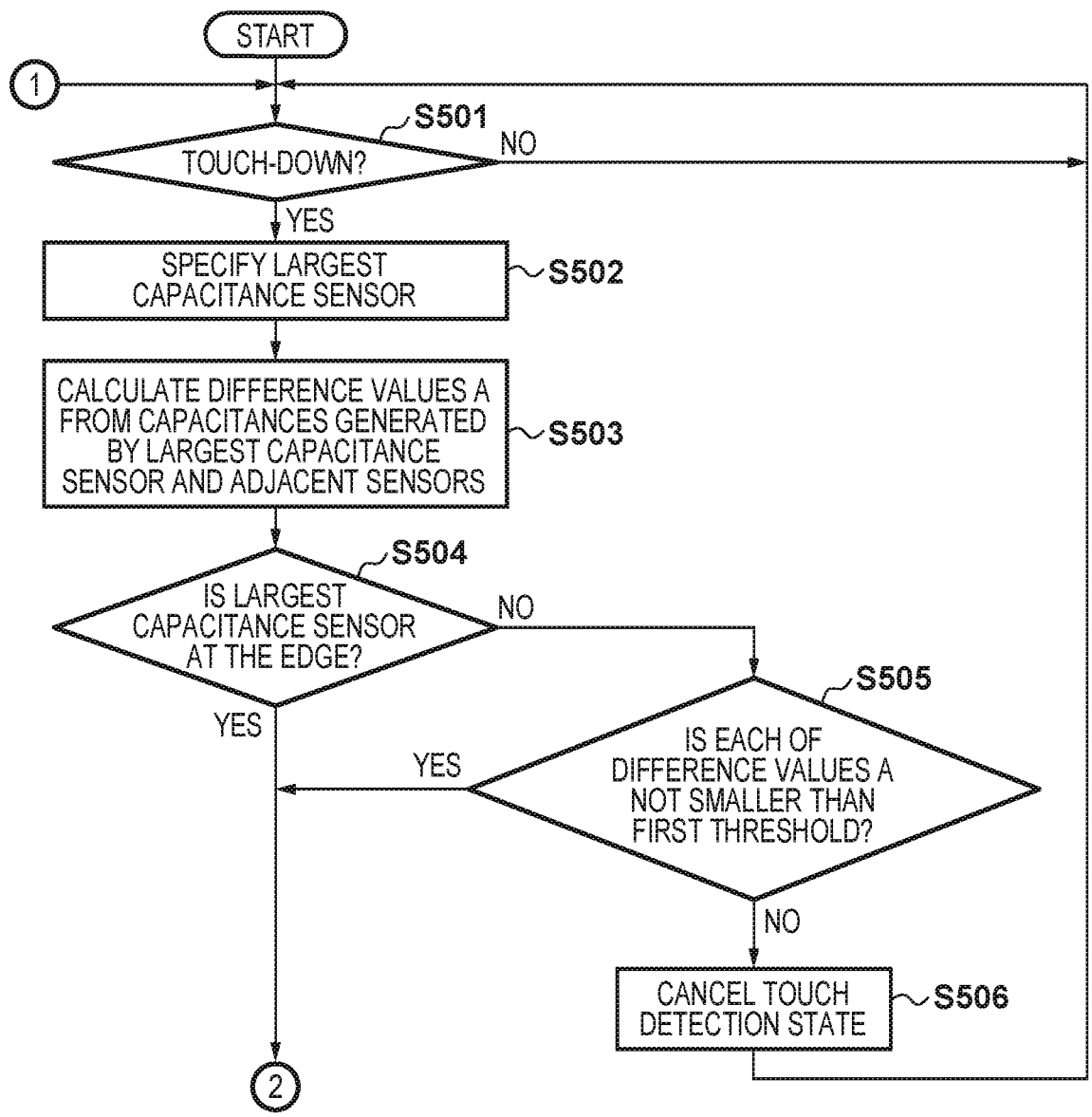
FIGS. 5A to 5C are flowcharts of processing for controlling a touch operation determination condition in accordance with the touch approach direction in the first embodiment.
Figure 5B:
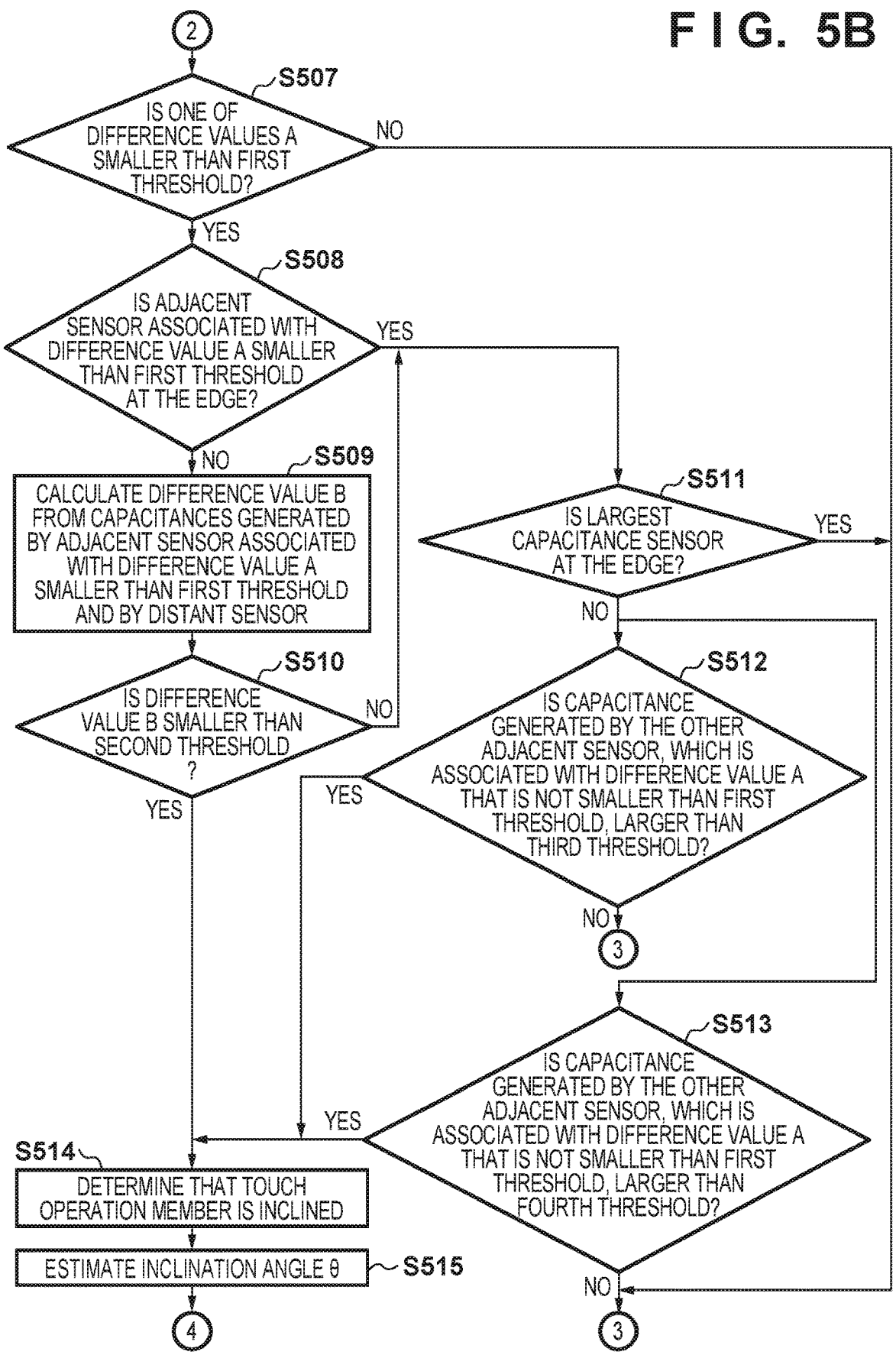
Figure 5C:
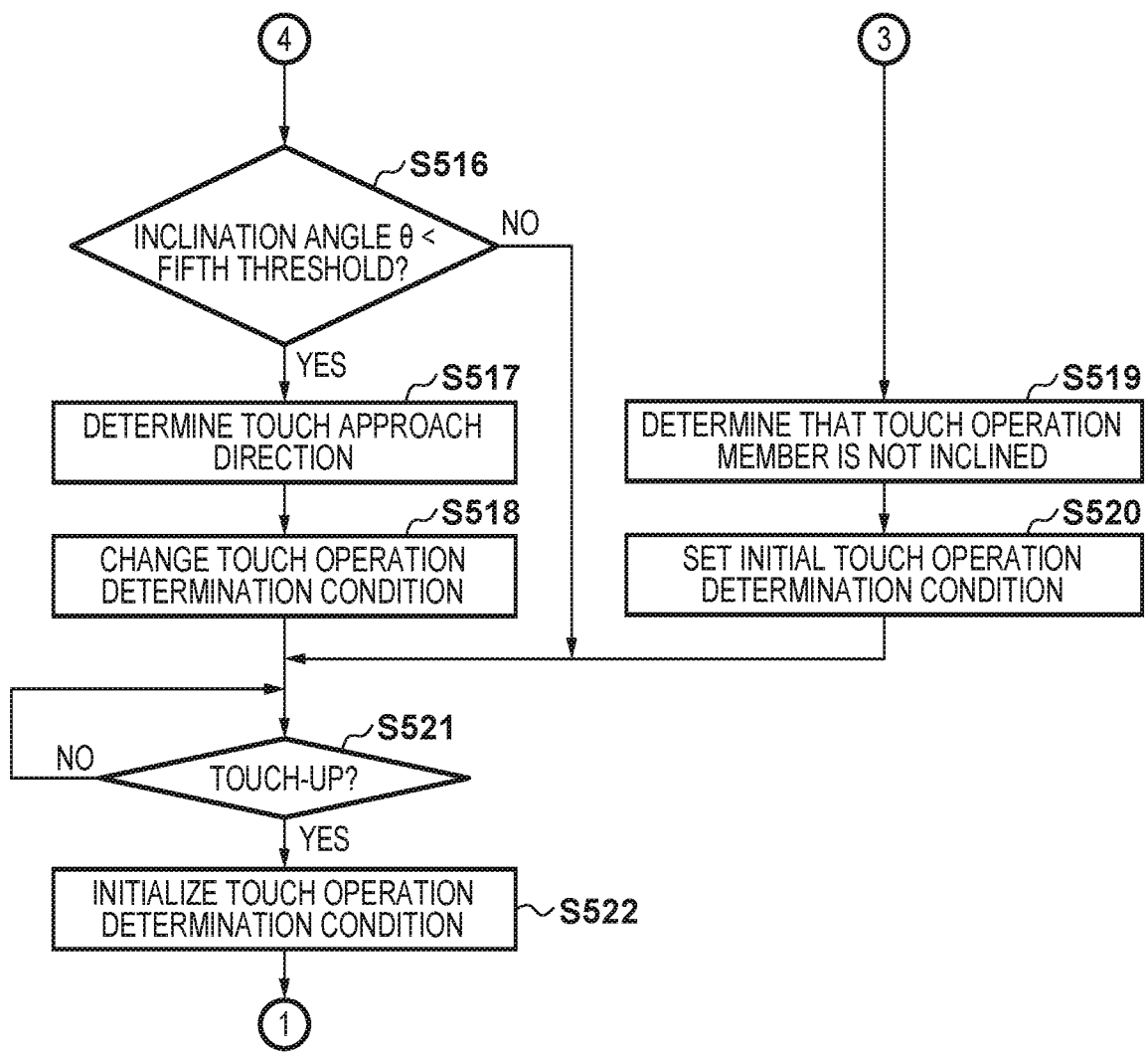

With reference to FIGS. 5A to 5C, a description is now given of processing for controlling a touch operation determination condition in accordance with a touch approach direction in the present embodiment.

For the sake of explanation, it will be assumed below that the largest capacitance sensor 201 is adjacent to two adjacent sensors 202, 203, and one of the adjacent sensors, specifically, the adjacent sensor 202, is adjacent to the distant sensor 210 as shown in FIGS. 2A to 2F.

Note that the processing shown in FIGS. 5A to 5C is realized by the main control unit 112 deploying a program stored in the internal storage medium 113 to the memory 114 and executing the deployed program. The same goes for later-described processing shown in FIGS. 9, 13, and 16.

In step S501, the main control unit 112 waits until the touch detection unit 107 detects a touch-down on the touchscreen 102, and if the touch-down is detected, the present processing proceeds to step S502.

In step S502, the main control unit 112 specifies the largest capacitance sensor 201. Note that when the touch sensors are arranged in three or more dimensions, a similar process is executed for each axis direction.

In step S503, the main control unit 112 causes the inclined state determination unit 111 to calculate the difference values 204, 207 (difference values A) so as to determine whether there is a possibility that the touch operation member 104 is inclined.

In step S504, the main control unit 112 determines whether the largest capacitance sensor 201 is at the edge from the coordinates of a touch position at the largest capacitance sensor 201, which have been calculated by the coordinate position calculation unit 109; if the largest capacitance sensor 201 is at the edge, the present processing proceeds to step S507, and if the largest capacitance sensor 201 is not at the edge, the present processing proceeds to step S505.

In step S505, the main control unit 112 determines whether a touch operation has been performed by a planar object, such as a palm. Here, the touch state determination unit 123 determines whether both of the difference values A calculated in step S503 are smaller than the first threshold 209; if both of them are smaller, the present processing proceeds to step S506, and if not, the present processing proceeds to step S507.

In step S506, the main control unit 112 cancels a touch detection state to exclude the touch operation performed by the planar object.

In step S507, the main control unit 112 determines whether there is a possibility that the touch operation member 104 is inclined. Here, the inclined state determination unit 111 determines whether one of the difference values 204, 207 is smaller than the first threshold 209. If one of them is smaller, it is determined that there is a possibility that the touch operation member 104 is inclined, and the present processing proceeds to step S508; if neither of them is smaller, it is determined that the touch operation member 104 is not inclined, and the present processing proceeds to step S519. It will be assumed below that the difference value A associated with the adjacent sensor 202 is smaller than the first threshold 209.

In step S508, the main control unit 112 determines whether the adjacent sensor 202 is at the edge so as to determine the existence of the distant sensor 210 adjacent to the adjacent sensor 202. If the adjacent sensor 202 is at the edge, it is determined that the distant sensor 210 does not exist, and the present processing proceeds to step S511; if the adjacent sensor 202 is not at the edge, it is determined that the distant sensor 210 exists, and the present processing proceeds to step S509.

In step S509, the main control unit 112 calculates the difference value 211 (difference value B) from the capacitance 206 generated by the adjacent sensor 202 and the capacitance 212 generated by the distant sensor 210, so as to cause the inclined state determination unit 111 to determine whether the touch operation member 104 is inclined.

In step S510, the main control unit 112 determines whether the touch operation member 104 is inclined. Here, the inclined state determination unit 111 determines whether the difference value 211 calculated in step S509 is smaller than the second threshold 213. If the difference value 211 is smaller, it is determined that the touch operation member 104 is inclined, and the present processing proceeds to step S514 (see FIG. 2A); if the difference value 211 is not smaller, the present processing proceeds to step S511 to make a further determination (see FIG. 2B).

In step S511, the main control unit 112 determines whether the largest capacitance sensor 201 is at the edge from the coordinates of the touch position at the largest capacitance sensor, which have been calculated by the coordinate position calculation unit 109. If the largest capacitance sensor 201 is at the edge, the inclined state determination unit 111 determines that the touch operation member 104 is not inclined, and the present processing proceeds to step S519; if the largest capacitance sensor 201 is not at the edge, it is determined that there is a possibility that the touch operation member 104 is inclined, and the present processing proceeds to step S512 or S513. Specifically, step S511 is followed by step S512 if preceded by step S508, and is followed by step S513 if preceded by step S510.

In step S512, the main control unit 112 determines whether the touch operation member 104 is inclined. Here, the inclined state determination unit 111 determines whether the capacitance 208 generated by the other adjacent sensor 203, which is associated with the difference value 207 (difference value A) that is not smaller than the first threshold 209, is larger than the third threshold 214. If the capacitance 208 is larger, it is determined that the touch operation member 104 is inclined, and the present processing proceeds to step S514 (see FIG. 2C); if the capacitance 208 is not larger, it is determined that the touch operation member 104 is not inclined, and the present processing proceeds to step S519 (see FIG. 2D).

In step S513, the main control unit 112 determines whether the touch operation member 104 is inclined. Here, the inclined state determination unit 111 determines whether the capacitance 208 generated by the other adjacent sensor 203, which is associated with the difference value 207 (difference value A) that is not smaller than the first threshold 209, is larger than the fourth threshold 215. If the capacitance 208 is larger, it is determined that the touch operation member 104 is inclined, and the present processing proceeds to step S514 (see FIG. 2E); if the capacitance 208 is not larger, it is determined that the touch operation member 104 is not inclined, and the present processing proceeds to step S519 (see FIG. 2F).

In step S514, the main control unit 112 determines that the touch operation member 104 is inclined with the aid of the inclined state determination unit 111, and estimates its inclination direction. Specifically, in step S514 preceded by step S510, a direction of a straight line that starts at the largest capacitance sensor 201 and inclines in a direction toward the distant sensor 210 is estimated as the inclination direction of the touch operation member 104 (see FIG. 2A). In step S514 preceded by step S512, a direction of a straight line that starts at the largest capacitance sensor 201 and inclines in a direction toward the adjacent sensor 202 is estimated as the inclination direction of the touch operation member 104 (see FIG. 2C). In step S514 preceded by step S513, a direction of a straight line that starts at the largest capacitance sensor 201 and inclines in a direction toward the adjacent sensor 203 is estimated as the inclination direction of the touch operation member 104 (see FIG. 2E).

In step S515, the main control unit 112 calculates the difference values 303, 304 so as to cause the inclined state determination unit 111 to estimate the inclination angle $\theta$ of the touch operation member 104. When the difference values 303, 304 are large, the inclination angle 307 is large (see FIG. 3A). When the difference values 303, 304 are small, the inclination angle 307 is small (see FIG. 3B).

In step S516, the main control unit 112 determines whether the inclination angle $\theta$ of the touch operation member 104 is smaller than a predetermined angle. Here, the inclined state determination unit 111 determines whether the inclination angle 307 is smaller than the fifth threshold 308. If the inclination angle 307 is smaller, it is determined that the touch operation member 104 is inclined to the extent that the determination of the touch approach direction is affected, and the present processing proceeds to step S517; if the inclination angle 307 is not smaller, it is determined that the determination of the touch approach direction is not affected, and the present processing proceeds to step S521.

In step S517, as the inclination angle $\theta$ of the touch operation member 104 is smaller than the predetermined angle, the main control unit 112 determines the touch approach direction under a condition for a small inclination angle $\theta$ (see FIGS. 3C to 3J). In this way, if the angle formed by the operation body and the operation surface is determined to be smaller than the predetermined angle (YES of step S516), the operating direction of the aforementioned touch-move operation is determined under a determination condition that varies according to the approach direction of the operation body toward the operation surface. On the other hand, if the angle formed by the operation body and the operation surface is determined to be equal to or larger than the predetermined angle (NO of step S516), the operating direction of the aforementioned touch-move operation is determined under a determination condition that is not dependent on the approach direction of the operation body toward the operation surface.

In step S518, the main control unit 112 causes the condition setting unit 116 to set a touch operation determination condition with reference to the selection table 401.

In step S519, the main control unit 112 determines that the touch operation member 104 is not inclined.

In step S520, the main control unit 112 causes the condition setting unit 116 to set an initial touch operation determination condition.

In step S521, the main control unit 112 waits until the touch detection unit 107 detects a touch-up on the touch-screen 102, and if the touch-up is detected, the present processing proceeds to step S522.

In step S522, the main control unit 112 causes the condition setting unit 116 to initialize the touch operation determination condition, and returns to step S501.

With reference to FIGS. 6A to 6I, a description is now given of specific examples of the processing for controlling a touch operation determination condition illustrated in FIGS. 5A to 5C.

A touch operation member 601 represents the touch operation member 104 at the start of a touch operation. A touch operation member 602 represents the touch operation member 104 following a touch-move operation performed by the touch operation member 601. A position 603 is a touch position of the touch operation member 601. A position 604 is a touch position of the touch operation member 602. An operating amount 605 is a moving amount in the X-direction from the position 603 to the position 604. An operating amount 606 is a moving amount in the Y-direction from the position 603 to the position 604.

Thresholds 607 to 610 are determination criterions for determining the operating amounts 605, 606 when the touch operation member 104 has moved upward, rightward, downward, and leftward, respectively. When the operating amounts 605, 606 are larger than the thresholds 607 to 610, it is determined that the touch operation has been performed in the corresponding directions; when they are smaller than the thresholds 607 to 610, it is determined that the touch operation has not been performed in the corresponding directions.

Altered thresholds 611 to 614 are determination criterions obtained by changing the thresholds 607 to 610 in accordance with the touch approach direction. It will be assumed that the altered thresholds 611 to 614 are smaller than the thresholds 607 to 610. It will also be assumed that these thresholds corresponding to varieties of the touch approach direction may have any values.

Trajectories 615 to 618 indicate the directions in which the touch operation member 104 can perform a touch operation when the touch approach direction is from lower left, upper left, upper right, and lower right, respectively. In the case of an operation that forms one of these trajectories, moving amounts of a leftward component and a rightward component are reduced.

FIG. 6A shows moving amounts of the touch operation member 104 during a touch operation, specifically, the operating amount 605 of |X2−X1| and the operating amount 606 of |Y2−Y1|, provided that the position 603 is (X1, Y1) and the position 604 is (X2, Y2), for example.

FIGS. 6B to 6I show touch operation determination conditions that are set in one-to-one correspondence with varieties of the touch approach direction.

As shown in FIG. 6B, when the touch approach direction is from down, a touch-move operation in the opposite direction (upward direction) is difficult to perform compared to a downward touch-move operation. In view of this, the threshold 607 is changed to the altered threshold 611 to improve the performance of an upward operation. In other words, a moving distance threshold for an upward touch-move operation is changed to have a smaller value, and the changed moving distance threshold is smaller than moving distance thresholds for move operations in directions other than the upward direction.

As shown in FIG. 6C, when the touch approach direction is from lower left, there is a possibility that a leftward or rightward touch-move operation is not performed as intended by the user and forms the trajectory 615. In view of this, the thresholds 608, 610 are respectively changed to the altered thresholds 612, 614 to improve the performance of a leftward or rightward operation. In other words, a moving distance threshold for a leftward or rightward touch-move operation is changed to have a smaller value, and the changed moving distance threshold is smaller than moving distance thresholds for move operations in directions other than the leftward or rightward direction.

As shown in FIG. 6D, when the touch approach direction is from left, a touch-move operation in the opposite direction (rightward direction) is difficult to perform compared to a leftward touch-move operation. In view of this, the threshold 608 is changed to the altered threshold 612 to improve the performance of a rightward operation. In other words, a moving distance threshold for a rightward touch-move operation is changed to have a smaller value, and the changed moving distance threshold is smaller than moving distance thresholds for move operations in directions other than the rightward direction.

As shown in FIG. 6E, when the touch approach direction is from upper left, there is a possibility that a leftward or rightward touch-move operation is not performed as intended by the user and forms the trajectory 616. In view of this, the thresholds 608, 610 are respectively changed to the altered thresholds 612, 614 to improve the performance of a leftward or rightward operation. In other words, a moving distance threshold for a leftward or rightward touch-move operation is changed to have a smaller value, and the changed moving distance threshold is smaller than moving distance thresholds for move operations in directions other than the leftward or rightward direction.

As shown in FIG. 6F, when the touch approach direction is from up, a touch-move operation in the opposite direction (downward direction) is difficult to perform compared to an upward touch-move operation. In view of this, the threshold 609 is changed to the altered threshold 613 to improve the performance of a downward operation. In other words, a moving distance threshold for a downward touch-move operation is changed to have a smaller value, and the changed moving distance threshold is smaller than moving distance thresholds for move operations in directions other than the downward direction.

As shown in FIG. 6G, when the touch approach direction is from upper right, there is a possibility that a leftward or rightward touch-move operation is not performed as intended by the user and forms the trajectory 617. In view of this, the thresholds 608, 610 are respectively changed to the altered thresholds 612, 614 to improve the performance of a leftward or rightward operation. In other words, a moving distance threshold for a leftward or rightward touch-move operation is changed to have a smaller value, and the changed moving distance threshold is smaller than moving distance thresholds for move operations in directions other than the leftward or rightward direction.

As shown in FIG. 6H, when the touch approach direction is from right, a touch-move operation in the opposite direction (leftward direction) is difficult to perform compared to a rightward touch-move operation. In view of this, the threshold 610 is changed to the altered threshold 614 to improve the performance of the leftward operation. In other words, a moving distance threshold for a leftward touch-move operation is changed to have a smaller value, and the changed moving distance threshold is smaller than moving distance thresholds for move operations in directions other than the leftward direction.

As shown in FIG. 6I, when the touch approach direction is from lower right, there is a possibility that a leftward or rightward touch-move operation is not performed as intended by the user and forms the trajectory 618. In view of this, the thresholds 608, 610 are respectively changed to the altered thresholds 612, 614 to improve the performance of a leftward or rightward operation. In other words, a moving distance threshold for a leftward or rightward touch-move operation is changed to have a smaller value, and the changed moving distance threshold is smaller than moving distance thresholds for move operations in directions other than the leftward or rightward direction.

Whatever the touch approach direction is, a moving distance threshold for determining that a touch-move operation has been performed in a direction opposite to the touch approach direction (e.g., a direction toward a side of the touchscreen that is opposite to a side thereof close to the base of a finger) is changed to have a smaller value. Furthermore, when the finger is approaching the rectangular touchscreen from a diagonal direction, a moving distance threshold for determining that a touch-move operation has been performed in the leftward or rightward direction is changed to have a smaller value.

A description is now given of the actions that take place when a touch operation determination threshold has been changed.

Although the following description pertains to the example of FIG. 6B (the touch approach direction is from down, and a moving distance threshold for the upward direction is changed to have a smaller value), the same rule applies to other varieties of the touch approach direction, except that the condition-change target direction varies.

As shown in FIG. 6B, when the touch approach direction is from down, a moving distance threshold for determining that an upward touch-move has been performed, or a moving distance threshold for determining that an upward flick has been performed, is changed to be smaller than thresholds for determining that a touch-move or a flick has been performed in directions other than the upward direction. Furthermore, as a result of this change, the moving distance threshold for determining that an upward touch-move has been performed, or the moving distance threshold for determining that an upward flick has been performed, becomes smaller. In this way, for example, when a touch operation has been performed by a finger that approaches the touchscreen 102 from down, it is determined that an upward touch-move has been performed if the finger moves upward by a relatively short distance while in contact with the touchscreen 102. Therefore, for example, during an operation of scrolling (moving a display position of) a display item, such as an image, that has been displayed in coordination with the touch-move, a transition to a scroll state can be achieved by a relatively small finger movement in the upward direction compared to other directions.

Furthermore, when the finger is released after quickly moving upward by a relatively short distance while in contact with the touchscreen 102, it is determined that an upward flick has been performed. Therefore, when switching between display contents by a flick operation (for example, a flick operation on a display screen causes a scroll state, and even after the finger is released, the scroll state continues due to the force of inertia), an instruction can be issued by a relatively small finger movement in the upward instruction compared to other directions. That is to say, an upward operation is made easy.

Furthermore, when a touch gesture input function utilizing a trajectory of a touch-move is allocated, a threshold for determining a preset touch gesture operation is changed. In this case, for example, a favorite attribute is appended to a display image normally when an upward touch-move of at least 10 mm (a moving distance threshold for a touch gesture operation) is detected. On the other hand, when a touch operation has been performed by a finger that approaches the touchscreen 102 from down as shown in FIG. 6B, a moving distance threshold for an upward touch gesture operation is reduced. As a result, the favorite attribute is appended to the display image when an upward touch-move of at least 5 mm is detected. When an image switch function (sequentially switching between display images) is allocated to a rightward touch gesture operation on the same screen, the following actions take place. For example, image switching is executed upon detection of a rightward touch-move of at least 10 mm before a rightward component of the touch-move satisfies conditions for a touch gesture operation allocated to other directions. Now, assume that a touch-move of a long distance has been performed in the upper right direction, specifically, a diagonal direction of 45 degrees. In this case, as an upward component of the touch-move reaches 5 mm before a rightward component of the touch-move reaches 10 mm, it is determined that this touch-move is an upward touch gesture operation; therefore, image switching is not executed, and the favorite attribute is appended to the display image. In this way, an upward touch-move is easily determined compared to a touch-move in other directions.

Note that there may be cases in which the moving distance thresholds for a touch-move, a flick, and a touch gesture have values that do not directly indicate distances. In one example of such cases, it is determined that an operation of moving in one of the directions (a touch-move, a flick, a touch gesture, etc.) has been performed when an absolute value of a distance of a touch-move operation has exceed a predetermined value. Then, a horizontal direction component $|x1-x0|$ and a vertical direction component $|y1-y0|$ of a moving distance from a touch start point $(x0, y0)$ to a currently touched position $(x1, y1)$ are compared with each other, and it is determined that the operation has been performed in the direction associated with a larger one of the components. In this case, the component in the condition-change target direction may be multiplied by a weighting coefficient larger than one in the course of comparison, so that the operation in the condition-change target direction is easily determined. Furthermore, it may be determined that the operation has been performed in the vertical direction when the ratio of the vertical direction component $|y1-y0|$ to the horizontal direction component $|x1-x0|$ is 0.8 or more, as opposed to a normal case in which it is determined that the operation has been performed in the vertical direction when the ratio of the vertical direction component $|y1-y0|$ to the horizontal direction component $|x1-x0|$ is 1 or more. That is to say, when the direction of a touch-move operation is determined from the ratio of a move component in one direction to a move component in another direction, a touch operation determination condition is changed to determine that the operation has been performed in the condition-change target direction (the direction in which the determination of the operation is made easy) even if the ratio of a component in the condition-change target direction to a component in another direction has been reduced.

As described above, the present embodiment eases a touch operation determination condition in accordance with an approach direction and an inclination angle of the touch operation member, and thus can embody, at low cost, an apparatus that can accurately determine a touch operation intended by the user regardless of the form of the touch operation. Furthermore, the present embodiment enables the user to easily perform a touch-move operation.

[Second Embodiment]

A second embodiment involves processing for changing a touch operation determination condition more appropriately by identifying the type of a touch operation member that has performed a touch operation, such as a thumb or an index finger, based on the size of a touch region.

First, a method of determining the size of the touch region according to the present embodiment will be described with reference to FIGS. 7A and 7B.

A touch operation member 701 represents a touch operation member 104 that accompanies a large touch region in a touch operation; it is, for example, a thumb.

A touch operation member 702 represents a touch operation member 104 that accompanies a small touch region in a touch operation compared to the touch operation member 701; it is, for example, an index finger.

A sixth threshold 703 is a threshold for determining the size of the touch region in relation to capacitance C; for example, the size (area) of the touch region is determined based on the number of touch sensors that generate capacitance 105 exceeding the sixth threshold 703 during a touch operation.

FIG. 7A is a diagram for describing a method of determining the size of the touch region associated with the touch operation member 701; for example, the size (area) of the touch region is determined to be "large" when the number of touch sensors that generate capacitance exceeding the sixth threshold 703 is six or more.

FIG. 7B is a diagram for describing a method of determining the size of the touch region associated with the touch operation member 702; for example, the size (area) of the touch region is determined to be "small" when the number of touch sensors that generate capacitance exceeding the sixth threshold 703 is two or more and less than six.

FIG. 8 exemplarily shows a selection table 801 according to the present embodiment, indicating a condition-change target direction for each variety of a touch approach direction.

The table 801 specifically indicates condition-change target directions in one-to-one correspondence with varieties of the touch approach direction in consideration of the size of the touch region. Similarly to FIG. 4, for the sake of simplicity, it will be assumed that four operating directions represented by the upward, downward, leftward, and rightward directions can be determined, and the touch approach direction is from one of the following eight directions: up, down, left, right, and four diagonal directions. For example, when the touch approach direction is from lower left and the touch region is "large," touch operation determination conditions for the leftward and rightward directions are changed. Usage examples of the table 801 are similar to those shown in FIGS. 6A to 6I.

Figure 9A:
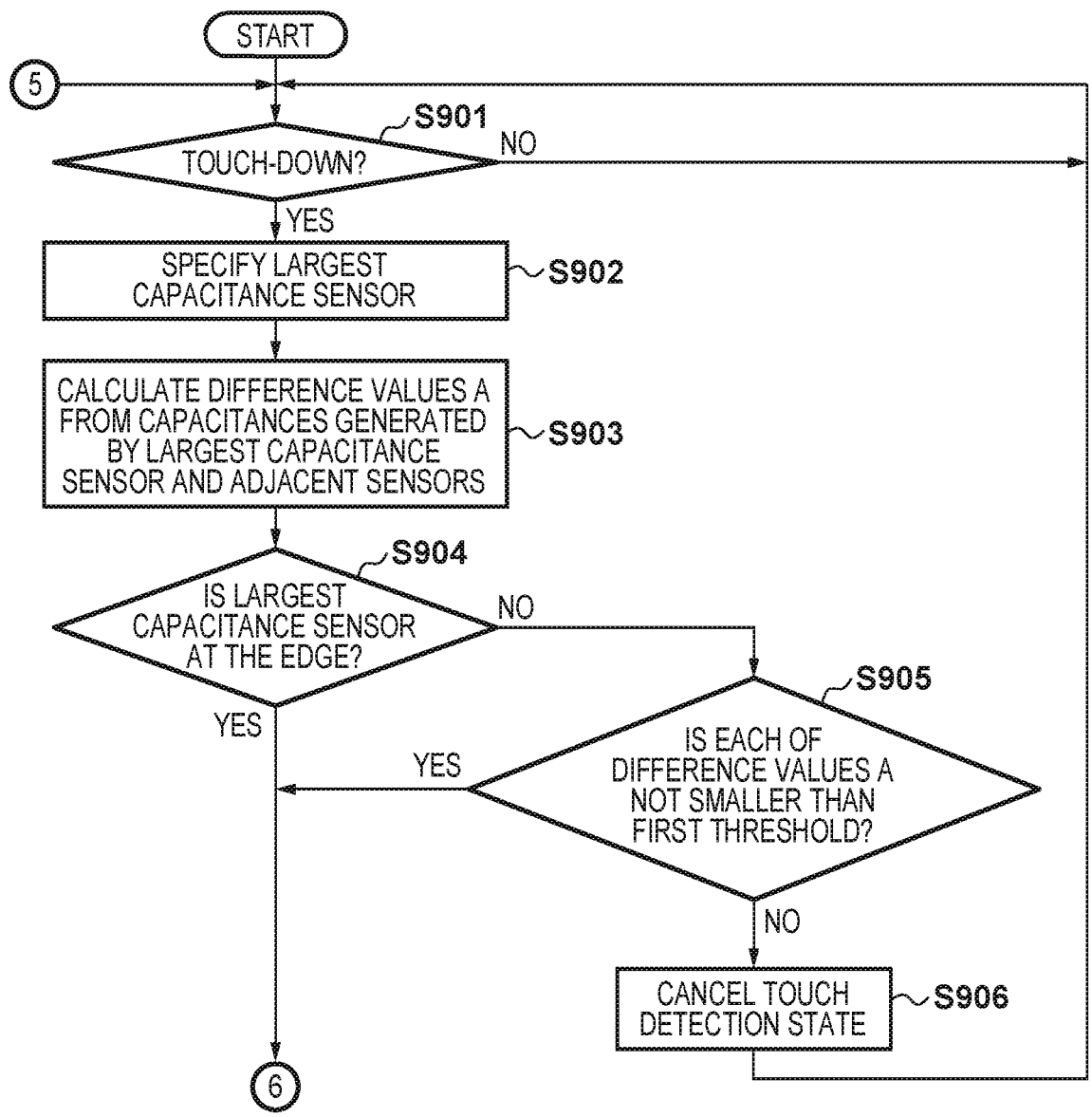
FIGS. 9A to 9C are flowcharts of processing for controlling a touch operation determination condition in accordance with the touch approach direction and the size of the touch region in the second embodiment.
Figure 9B:
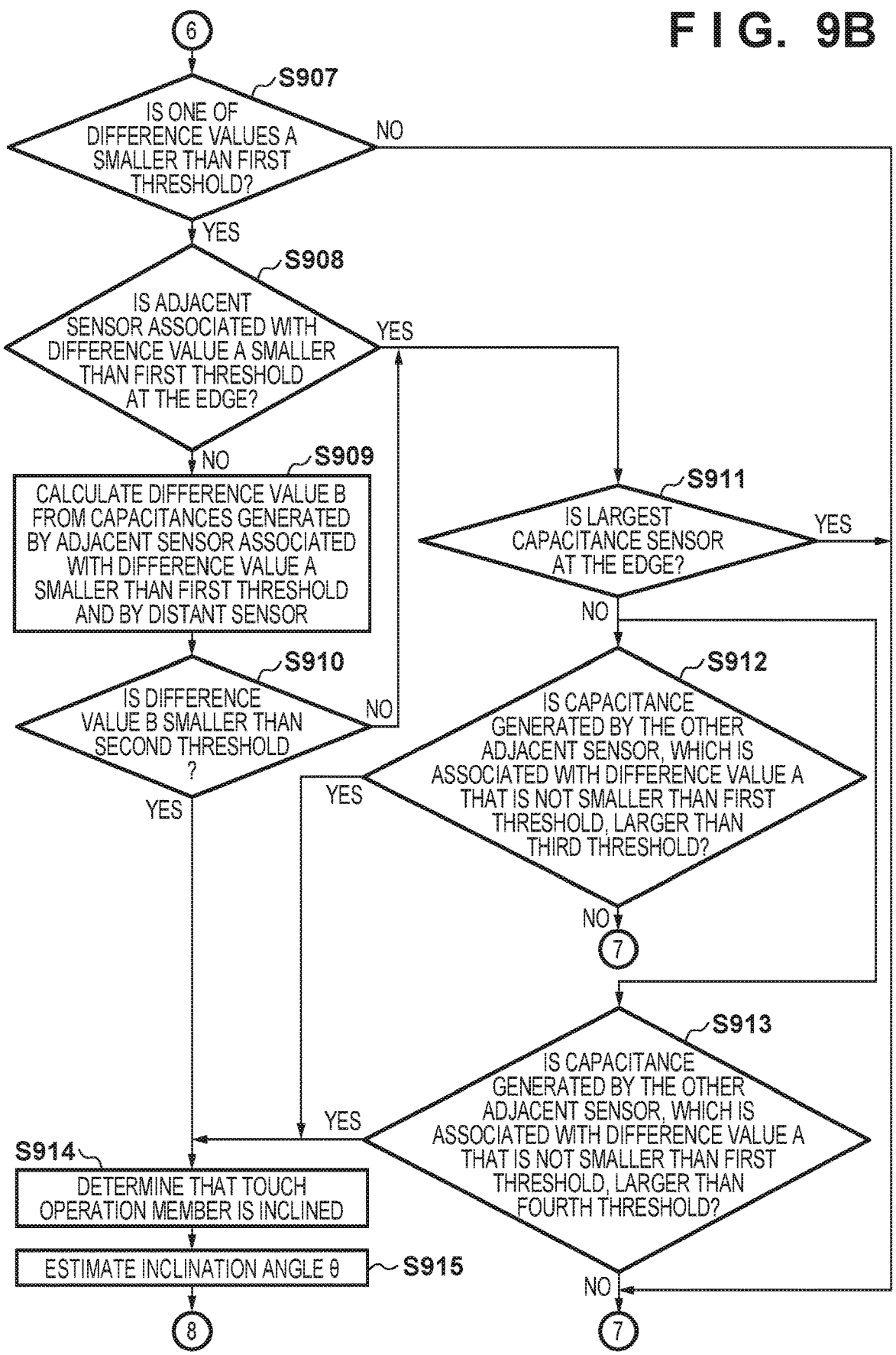
Figure 9C:
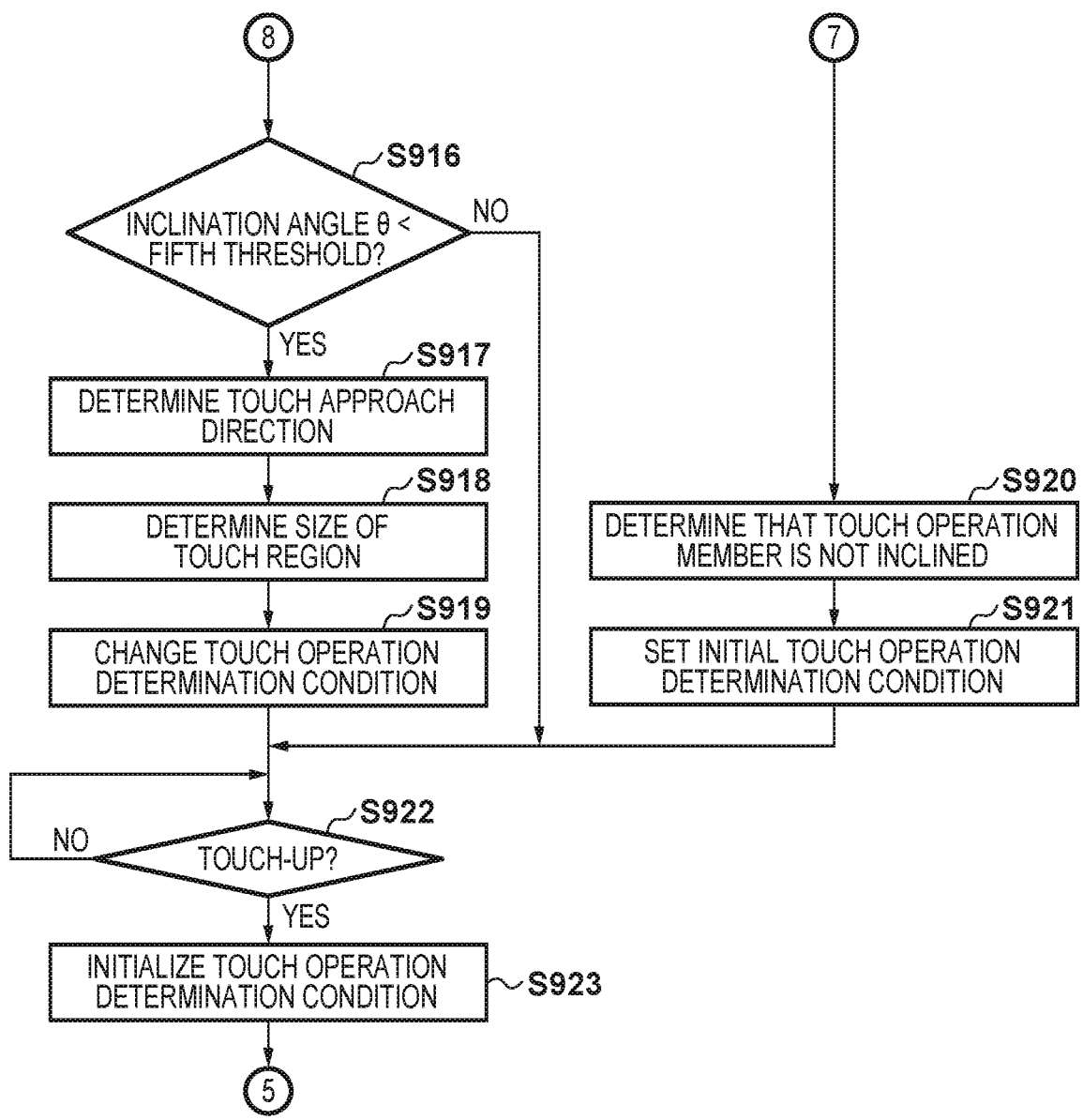

With reference to FIGS. 9A to 9C, a description is now given of processing for controlling a touch operation determination condition in accordance with the touch approach direction and the size of the touch region in the present embodiment.

As the processes in steps S901 to S917 and S920 to S923 of FIGS. 9A to 9C are similar to the processes in steps S501 to 517 and S519 to S522 of FIGS. 5A to 5C, a description thereof will be omitted in the following description, which deals with differences between these figures.

In step S918, the main control unit 112 causes the touch state determination unit 123 to determine the size of the touch region.

In step S919, the main control unit 112 causes the condition setting unit 116 to set a touch operation determination condition with reference to the table 801, and thereafter, the subsequent processes are executed.

As described above, the present embodiment not only achieves the effects achieved by the above first embodiment, but also eases a touch operation determination condition in accordance with the size of the touch region, and thus can embody, at low cost, an apparatus that can accurately determine a touch operation intended by a user regardless of the form of the touch operation. Furthermore, the present embodiment enables the user to easily perform a touch-move operation.

[Third Embodiment]

A third embodiment involves processing for determining a touch input angle with respect to the touchscreen in-plane axis in relation to a touch approach direction of the touch operation member 104, and changing a touch operation determination condition based on the touch input angle with respect to the touchscreen in-plane axis.

First, a description is given of a method used by the touch input angle determination unit 124 according to the present embodiment to determine a touch input angle with respect to the touchscreen in-plane axis with reference to FIGS. 10A to 10D.

Sensor intersections 1001 are points of intersection between the aforementioned horizontal axis direction sensors 103a and vertical axis direction sensors 103b. Inter-sensor capacitance 1002 is generated by contact or proximity between the touch operation member 104 and the touchscreen 102 at each sensor intersection 1001.

A touch region 1003 is a region of contact between the touch operation member 104 and the touchscreen 102. For example, the shape of the touch region 1003 is approximated by the shape of an ellipse composed of sensor intersections 1005 (including a later-described sensor intersection 1006), at each of which the inter-sensor capacitance 1002 exceeds a seventh threshold 1004. Provided that a major axis 1007 and a minor axis 1008 of the ellipse serving as the approximate shape of the touch region 1003 are a and b, respectively, and that an angle 1010 formed by the major axis 1007 and a reference axis 1009 is denoted by $\alpha$, the angle 1010 can be calculated from the following expression: $\alpha$=[arc cos $\{(b^2-a^2)/(a^2+b^2)\}$]/2. The sensor intersection 1006 has the largest inter-sensor capacitance C among the sensor intersections 1005.

Groups 1011a to 1011c of sensor intersections in the horizontal axis direction each exhibit inter-sensor capacitances C that are generated along the horizontal axis direction at sensor intersections overlapping the touch region 1003 in the corresponding row.

Groups 1012a to 1012d of sensor intersections in the vertical axis direction each exhibit inter-sensor capacitances C that are generated along the vertical axis direction at sensor intersections overlapping the touch region 1003 in the corresponding column.

Among the inter-sensor capacitances 1002, inter-sensor capacitances 1013 exceed the seventh threshold 1004, and correspond to the sensor intersections 1005.

An inter-sensor capacitance 1014 is the largest of the inter-sensor capacitances 1002, and corresponds to the sensor intersection 1006.

A touch input angle 1015 is an angle formed by a reference direction 1016 of the reference axis 1009 and the major axis 1007 of the approximate ellipse representing the touch region 1003 (a touch approach direction 1017 of the touch operation member 104). Note that the angle may be replaced with any index that indicates the extent of the touch input angle. Hereinafter, it will be assumed that the value of the touch input angle 1015 is denoted by $\alpha'$.

The touch approach direction 1017 is determined based on a positional relationship between the sensor intersection 1006 that has the largest inter-sensor capacitance C among the sensor intersections 1005 and a sensor intersection 1018 that is distant from the sensor intersection 1006 with the largest capacitance C. For example, in FIG. 10A, the touch approach direction 1017 is a direction that starts at the sensor intersection 1006 with the largest capacitance C and is directed toward the sensor intersection 1018 distanced from the sensor intersection 1006 (from lower left). Provided that the reference direction 1016 (0°) is a downward direction, the touch input angle 1015 satisfies the relationship $\alpha=\alpha'$. It will be assumed that the degrees 0° to 360° are plotted in a clockwise direction.

FIG. 10A exemplarily shows the touch input angle 1015 in a case where the touch approach direction of the touch operation member 104 is from lower left. FIG. 10B exemplarily shows the touch input angle 1015 in a case where the touch approach direction of the touch operation member 104 is from upper left; here, the relationship $\alpha'=180°-\alpha$ holds. FIG. 10C exemplarily shows the touch input angle 1015 in a case where the touch approach direction of the touch operation member 104 is from upper right; here, the relationship $\alpha'=180°+\alpha$ holds. FIG. 10D exemplarily shows the touch input angle 1015 in a case where the touch approach direction of the touch operation member 104 is from lower right; here, the relationship $\alpha'=360°-\alpha$ holds.

FIGS. 11A to 11H show specific examples of the touch input angle with respect to the touchscreen in-plane axis in the present embodiment. In FIG. 11A, the touch input angle 1015 with respect to the reference direction 1016 is determined as follows: $\alpha'=0°$ (360°). In FIG. 11B, the touch input angle 1015 is determined as follows: $\alpha'=45°$. In FIG. 11C, the touch input angle 1015 is determined as follows: $\alpha'=90°$. In FIG. 11D, the touch input angle 1015 is determined as follows: $\alpha'=135°$. In FIG. 11E, the touch input angle 1015 is determined as follows: $\alpha'=180°$. In FIG. 11F, the touch input angle 1015 is determined as follows: $\alpha'=225°$. In FIG. 11G, the touch input angle 1015 is determined as follows: α'=270°. In FIG. 11H, the touch input angle 1015 is determined as follows: α'=315°.

FIG. 12 exemplarily shows a selection table 1201 according to the present embodiment, indicating a condition-change target direction for each range of the touch input angle with respect to the touchscreen in-plane axis.

The table 1201 specifically indicates condition-change target directions in one-to-one correspondence with the ranges of the touch input angle with respect to the touchscreen in-plane axis. Similarly to FIGS. 4 and 8, for the sake of simplicity, it will be assumed that four operating directions represented by the upward, downward, leftward, and rightward directions can be determined, and the ranges of the touch input angle with respect to the touchscreen in-plane axis correspond to eight directions. For example, when the touch input angle 1015 with respect to the touchscreen in-plane axis satisfies the relationship α'=0° to 10° or α'=350° to 360°, a touch operation determination condition for the upward direction is changed. Usage examples of the table 1201 will be described later with reference to FIGS. 14A to 14I.

Figure 13:
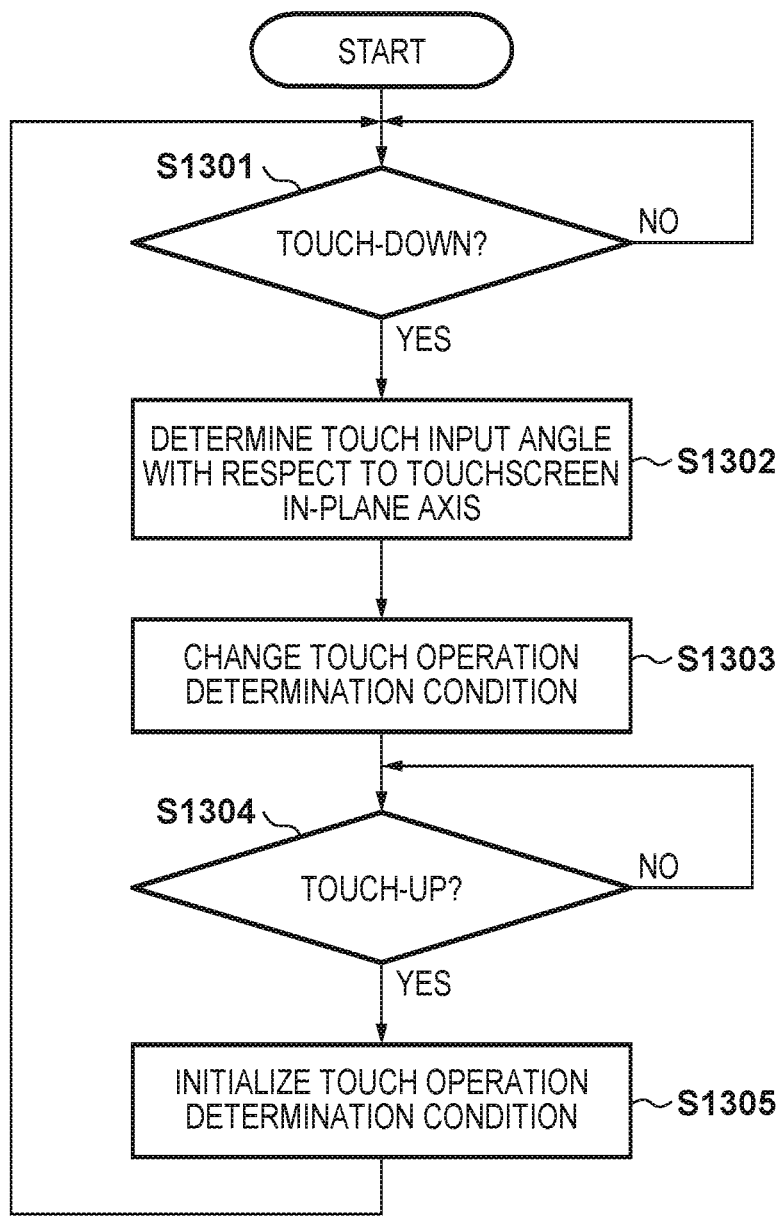
FIG. 13 is a flowchart of processing for controlling a touch operation determination condition in accordance with the touch input angle with respect to the touchscreen in-plane axis in the third embodiment.

With reference to FIG. 13, a description is now given of processing for controlling a touch operation determination condition in accordance with the touch input angle with respect to the touchscreen in-plane axis in the present embodiment.

In step S1301, the main control unit 112 waits until the touch detection unit 107 detects a touch-down on the touchscreen 102, and if the touch-down is detected, the present processing proceeds to step S1302.

In step S1302, the main control unit 112 causes the touch input angle determination unit 124 to determine the touch input angle with respect to the touchscreen in-plane axis.

In step S1303, the main control unit 112 causes the condition setting unit 116 to set a touch operation determination condition for the condition-change target direction corresponding to the touch input angle determined in step S1302 with reference to the selection table 1201.

In step S1304, the main control unit 112 waits until the touch detection unit 107 detects a touch-up on the touchscreen 102, and if the touch-up is detected, the present processing proceeds to step S1305. In this way, a touch operation determination condition is changed in accordance with an input angle at the time of a touch-down; however, if the position, shape, and area of the touch change while the touch is maintained after the touch-down, the touch operation determination condition is not changed. This is because, when an approach direction at the time of the touch-down has been changed by a touch-move, the changed approach direction does not feel natural to a user compared to the approach direction at the time of the touch-down, and hence there is a possibility that the usability cannot be improved by changing the touch operation determination condition. In other words, changing of the touch operation determination condition improves the usability when a finger performs a touch-move following a touch-down. If the touch-up is not detected in step S1304, the present processing may return to step S1302 to dynamically change the touch operation determination condition while the touch is maintained. The same goes for the cases in which the touch-up is not detected in the aforementioned steps S521 and S922 and later-described step S1605. That is to say, although the touch operation determination condition is basically changed based on the approach direction at the time of the touch-down so as to improve the performance of a touch-move operation following the touch-down, the touch operation determination condition may be dynamically changed while the touch is maintained.

In step S1305, the main control unit 112 causes the condition setting unit 116 to initialize the touch operation determination condition, and then the present processing returns to step S1301.

With reference to FIGS. 14A to 14I, a description is now given of specific examples of the processing for controlling a touch operation determination condition illustrated in FIG. 13.

Note that the reference signs given to the elements illustrated in FIGS. 6A to 6I, 10A to 10D, and 11A to 11H are shared in common with similar elements shown in FIG. 14, and a description of the similar elements will be omitted in the following description, which deals with differences between these figures.

Altered thresholds 1401 to 1404 are determination criterions obtained by changing the thresholds 607 to 610 in accordance with the touch input angle 1015. It will be assumed that the altered thresholds 1401 to 1404 are smaller than the thresholds 607 to 610. It will also be assumed that these thresholds corresponding to the ranges of the touch input angle may have any values.

Similarly to FIG. 6A, FIG. 14A shows moving amounts of the touch operation member 104 during a touch operation, specifically, the operating amount 605 of |X2−X1| and the operating amount 606 of |Y2−Y1|, provided that the position 603 is (X1, Y1) and the position 604 is (X2, Y2), for example.

FIGS. 14B to 14I show touch operation determination conditions that are set in one-to-one correspondence with varieties of the touch input angle with respect to the touchscreen in-plane axis.

As shown in FIG. 14B, when the touch approach direction 1017 is from down and the touch input angle 1015 satisfies the relationship α'=0° (360°), a touch-move operation in the opposite direction (upward direction) is difficult to perform. In view of this, the threshold 607 is changed to the altered threshold 1401 to improve the performance of an upward operation. In other words, a moving distance threshold for an upward touch-move operation is changed to have a smaller value, and the changed moving distance threshold is smaller than moving distance thresholds for move operations in directions other than the upward direction.

As shown in FIG. 14C, when the touch approach direction 1017 is from lower left and the touch input angle 1015 satisfies the relationship α'=45°, there is a possibility that a leftward or rightward touch-move operation is not performed as intended by the user and forms the trajectory 615. In view of this, the thresholds 608, 610 are respectively changed to the altered thresholds 1402, 1404 to improve the performance of a leftward or rightward operation. In other words, a moving distance threshold for a leftward or rightward touch-move operation is changed to have a smaller value, and the changed moving distance threshold is smaller than moving distance thresholds for move operations in directions other than the leftward or rightward direction.

As shown in FIG. 14D, when the touch approach direction 1017 is from left and the touch input angle 1015 satisfies the relationship α'=90°, a touch-move operation in the opposite direction (rightward direction) is difficult to perform. In view of this, the threshold 608 is changed to the altered threshold 1402 to improve the performance of a rightward operation. In other words, a moving distance threshold for a rightward touch-move operation is changed to have a smaller value, and the changed moving distance threshold is smaller than moving distance thresholds for move operations in directions other than the rightward direction.

As shown in FIG. 14E, when the touch approach direction 1017 is from upper left and the touch input angle 1015 satisfies the relationship $α'=135°$, there is a possibility that a leftward or rightward touch-move operation is not performed as intended by the user and forms the trajectory 616. In view of this, the thresholds 608, 610 are respectively changed to the altered thresholds 1402, 1404 to improve the performance of a leftward or rightward operation. In other words, a moving distance threshold for a leftward or rightward touch-move operation is changed to have a smaller value, and the changed moving distance threshold is smaller than moving distance thresholds for move operations in directions other than the leftward or rightward direction.

As shown in FIG. 14F, when the touch approach direction 1017 is from up and the touch input angle 1015 satisfies the relationship $α'=180°$, a touch-move operation in the opposite direction (downward direction) is difficult to perform. In view of this, the threshold 609 is changed to the altered threshold 1403 to improve the performance of a downward operation. In other words, a moving distance threshold for a downward touch-move operation is changed to have a smaller value, and the changed moving distance threshold is smaller than moving distance thresholds for move operations in directions other than the downward direction.

As shown in FIG. 14G, when the touch approach direction 1017 is from upper right and the touch input angle 1015 satisfies the relationship $α'=225°$, there is a possibility that a leftward or rightward touch-move operation is not performed as intended by the user and forms the trajectory 617. In view of this, the thresholds 608, 610 are respectively changed to the altered thresholds 1402, 1404 to improve the performance of a leftward or rightward operation. In other words, a moving distance threshold for a leftward or rightward touch-move operation is changed to have a smaller value, and the changed moving distance threshold is smaller than moving distance thresholds for move operations in directions other than the leftward or rightward direction.

As shown in FIG. 14H, when the touch approach direction 1017 is from right and the touch input angle 1015 satisfies the relationship $α'=270°$, a touch-move operation in the opposite direction (leftward direction) is difficult to perform. In view of this, the threshold 610 is changed to the altered threshold 1404 to improve the performance of a leftward operation. In other words, a moving distance threshold for a leftward touch-move operation is changed to have a smaller value, and the changed moving distance threshold is smaller than moving distance thresholds for move operations in directions other than the leftward direction.

As shown in FIG. 14I, when the touch approach direction 1017 is from lower right and the touch input angle 1015 satisfies the relationship $α'=315°$, there is a possibility that a leftward or rightward touch-move operation is not performed as intended by the user and forms the trajectory 618. In view of this, the thresholds 608, 610 are respectively changed to the altered thresholds 1402, 1404 to improve the performance of a leftward or rightward operation. In other words, a moving distance threshold for a leftward or rightward touch-move operation is changed to have a smaller value, and the changed moving distance threshold is smaller than moving distance thresholds for move operations in directions other than the leftward or rightward direction.

Whatever the touch approach direction is, a moving distance threshold for determining that a touch-move operation has been performed in a direction opposite to the touch approach direction is changed to have a smaller value. Furthermore, when the finger is approaching the rectangular touchscreen from a diagonal direction, a moving distance threshold for determining that a touch-move operation has been performed in the leftward or rightward direction is changed to have a smaller value. Other configurations are similar to those described with reference to FIGS. 6A to 6I according to the first embodiment.

As described above, the present embodiment eases a touch operation determination condition in accordance with the touch input angle of the touch operation member 104 with respect to the touchscreen in-plane axis, and thus can embody, at low cost, an apparatus that can accurately determine a touch operation intended by the user regardless of the form of the touch operation. Furthermore, the present embodiment enables the user to easily perform a touch-move operation.

[Fourth Embodiment]

A fourth embodiment involves processing for changing a touch operation determination condition more appropriately by identifying the type of the touch operation member 104 that has performed a touch operation, such as a thumb or an index finger, based on the size of a touch region in addition to a touch input angle of the touch operation member 104 with respect to the touchscreen in-plane axis.

Note that a method of determining the size of the touch region according to the present embodiment is similar to the one described with reference to FIGS. 7A and 7B of the second embodiment in which sensor intersections of touch sensors are used.

FIG. 15 exemplarily shows a selection table 1501 according to the present embodiment, indicating a condition-change target direction for each range of the touch input angle with respect to the in-plane touchscreen axis.

The table 1501 specifically indicates condition-change target directions in one-to-one correspondence with the ranges of the touch input angle in consideration of the size of the touch region. Similarly to FIG. 12, for the sake of simplicity, it will be assumed that four operating directions represented by the upward, downward, leftward, and rightward directions can be determined, and the ranges of the touch input angle correspond to eight directions. For example, when the touch input angle with respect to the touchscreen in-plane axis satisfies the relationship $α'=0°$ to $10°$ or $α'=350°$ to $360°$ and the size of the touch region is "large," a touch operation determination condition for the upward direction is changed. Usage examples of the table 1501 are similar to those shown in FIGS. 14A to 14I, and thus a description thereof will be omitted. In a case where a touch operation has been performed by a thumb, there is a high possibility that the thumb belongs to a hand gripping an apparatus body. In this case, when a user has attempted to perform a straight touch-move in the leftward or rightward direction, there is a high possibility that the touch-move nevertheless forms an arc-lie trajectory, like the trajectories 615 to 618, against the user's intention due to a movable range of the thumb. On the other hand, in a case where an operating finger is an index finger, there is a high possibility that the index finger belongs to a hand different from the hand gripping the apparatus body. A touch operation performed by the index finger of the hand different from the hand gripping the apparatus body has a high degree of freedom, and is easily maneuvered in harmony with the user's intention. Therefore, there is a low possibility that an operation resulting in an arc-like trajectory, like the aforementioned operation by the thumb, is inappropriately performed. In view of this, as shown in FIG. 15, when the touch region is small, it is predicted that the operating finger is not the thumb but the index finger, and as there is a low possibility that a leftward or rightward touch-move operation forms an arc-like trajectory, a condition for a touch-move in a direction associated with an arc-like trajectory is not changed (diagonal lines in FIG. 15). On the other hand, when the touch region is large, it is predicted that the operating finger is the thumb, and thus a condition is changed so that the aforementioned touch-move that forms an arc-like trajectory is easily determined as a leftward or rightward touch-move. Note that the same concept applies to FIG. 8.

Figure 16:
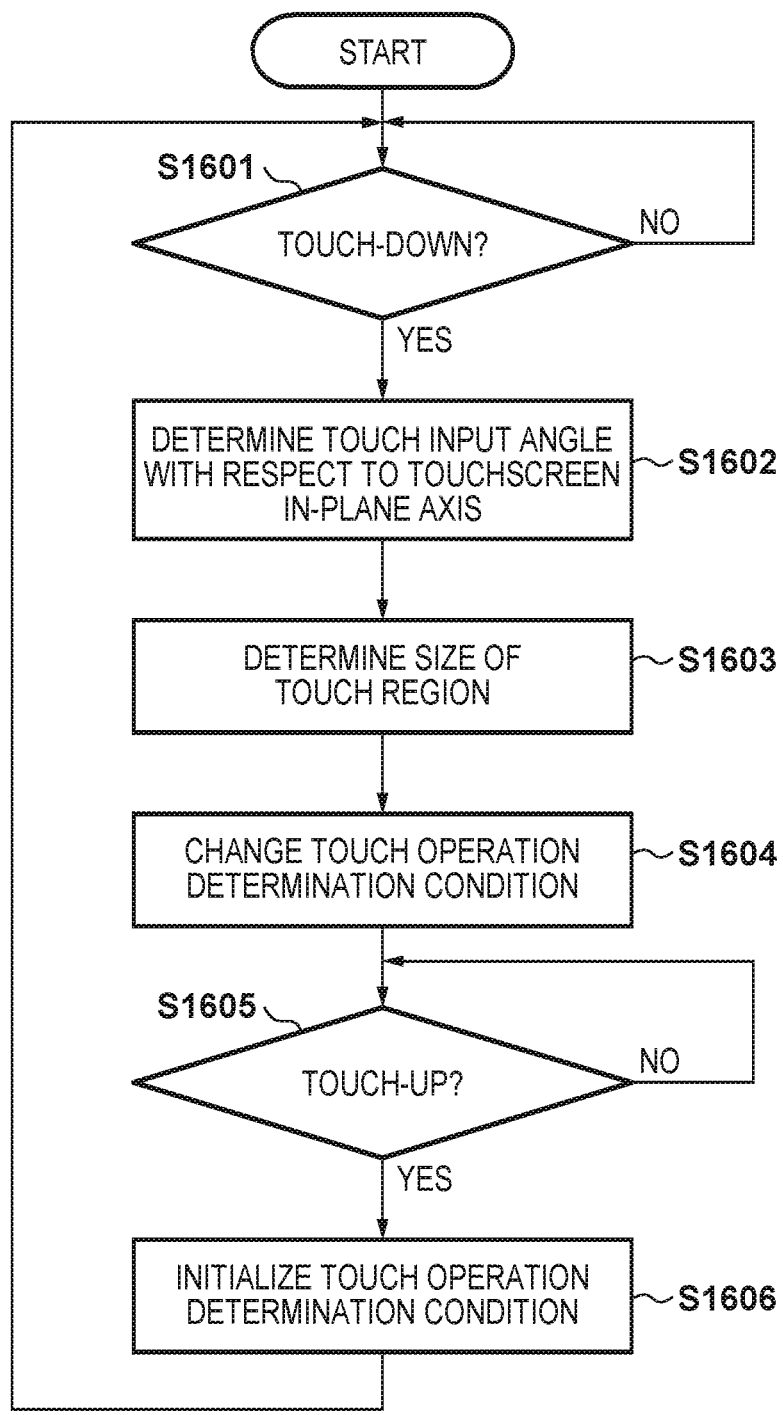
FIG. 16 is a flowchart of processing for controlling a touch operation determination condition in accordance with the touch input angle and the size of a touch region in the fourth embodiment.

With reference to FIG. 16, a description is now given of processing for controlling a touch operation determination condition in accordance with the touch input angle with respect to the touchscreen in-plane axis and the size of the touch region in the present embodiment.

As the processes in steps S1601, S1602, S1605, and S1606 of FIG. 16 are similar to the processes in steps S1301, S1302, S1304, and S1305 of FIG. 13, a description thereof will be omitted in the following description, which deals with differences between these figures.

In step S1603, the main control unit 112 causes the touch state determination unit 123 to determine the size of the touch region.

In step S1604, the main control unit 112 causes the condition setting unit 116 to set a touch operation determination condition with reference to the table 1501, and thereafter, the subsequent processes are executed.

As described above, the present embodiment not only achieves the effects achieved by the above third embodiment, but also eases a touch operation determination condition in accordance with the size of the touch region, and thus can embody, at low cost, an apparatus that can accurately determine a touch operation intended by the user regardless of the form of the touch operation. Furthermore, the present embodiment enables the user to easily perform a touch-move operation.

The present invention is not limited to its suitable embodiments described above, and includes many variations and modifications without departing from the concept of the present invention. For example, although capacitances generated by touch sensors are used as the basis for determining whether a touch operation has been performed in the first and second embodiments, inter-sensor capacitances may be used as the basis for the determination as in the third and fourth embodiments. In the third and fourth embodiments, capacitances generated by touch sensors may be used as the basis for determining whether a touch operation has been performed. It is sufficient for output from the touch sensors 103 to change in association with changes in capacitances C caused by a touch operation, like the number of charge-discharge cycles of a capacitor in a certain period. An index used to determine the inclined state of the touch operation member 104 is not limited to a difference value, and may be something that is based on the magnitudes of capacitances C. The inclination angle $\theta$ may be estimated from a difference value associated with capacitance 105 generated by one touch sensor, and may change in accordance with the number of touch sensors that are located along the direction of inclination of the touch operation member 104. In the foregoing description, four operating directions represented by the upward, downward, leftward, and rightward directions can be determined; alternatively, the number of operating directions that can be determined may be any number. In the foregoing description, eight varieties of a touch approach direction can be determined (i.e., from up, down, left, right, and four diagonal directions), and the ranges of a touch input angle correspond to eight directions; alternatively, the number of varieties of the touch approach direction, as well as the number of ranges of the touch input angle, may be any number. In the foregoing embodiments, a threshold for a condition-change target direction in which the operational performance should be improved is changed to have a smaller value so as to ease a touch operation determination condition for that direction; alternatively, a threshold for a direction that does not suffer a decrease in the operational performance may be changed to have a larger value so as to tighten a touch operation determination condition for that direction. The size of the touch region is determined to be one of the two patterns, "large" and "small," in FIGS. 7A, 7B, and 15; alternatively, any number of patterns may be provided. Determination thresholds may have any values, and any number of sensors may be provided. In FIGS. 10A to 10D, the touch input angle is calculated using the shape of an ellipse as the approximate shape of a contact region 1013; alternatively, other calculation methods may be used. The reference direction 1016 is not limited to the downward direction, and may be any direction. In the third embodiment, the touch approach direction 1017 is determined based on the positional relationship between the sensor intersection 1006 with the largest capacitance and the sensor intersection 1018 that is distant from the sensor intersection 1006; alternatively, the touch approach direction 1017 may be determined using other methods. In the foregoing description, the degrees 0° to 360°, which are candidates for the touch input angle $\alpha'$, are plotted in a clockwise direction; alternatively, they may be plotted in other directions, such as a counter-clockwise direction.

Note that a single item of hardware may control the main control unit 112, or the entire apparatus may be controlled by a plurality of items of hardware sharing processing.

Although the present invention has been elaborated above based on suitable embodiments thereof, the present invention is by no means limited to these specific embodiments and includes various modifications without departing from the concept of the present invention.

The foregoing embodiments have dealt with an example in which the present invention is applied to an electronic apparatus, such as a smartphone and a tablet, that includes a touchscreen-equipped display unit; however, the present invention is not limited to this example, and is applicable to an apparatus that includes a display unit with a touch detection function. That is to say, the present invention is applicable to, for example, the following apparatuses: a personal computer, such as a tablet; a mobile telephone, such as a smartphone (including an eyeglass-type terminal and a watch-type terminal); a PDA (mobile information terminal); a mobile image viewer; a printer equipped with a display apparatus; a digital photo frame; a music player; a game console; an e-book reader; an office automation apparatus, such as a fax machine and a copier; and a medical apparatus, such as an electrocardiograph and a sphygmomanometer.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2015-184317, filed Sep. 17, 2015 and 2016-011884, filed Jan. 25, 2016 which are hereby incorporated by reference herein in their entireties.

What is claimed is:

1. An electronic apparatus, comprising:
a touch detection unit configured to detect a touch operation performed on an operation surface by an operation body;
a determination unit configured to, on an occurrence of a slide move operation in which the operation body moves while in contact with the operation surface, determine an operating direction of the slide move operation under a determination condition;
a changing unit configured to change the determination condition according to an approach direction of the operation body toward the operation surface; and
a control unit configured to perform control to execute a function corresponding to the operating direction determined by the determination unit,
wherein the change unit changes the determination condition so that a specific direction associated with the approach direction of the operation body toward the operation surface is determined as the operating direction of the slide move operation compared to other directions,
wherein the determination unit determines that the operating direction of the slide move operation is a first direction when, from move components of the slide move operation, a move component in the first direction has exceeded a first threshold, and
the change unit changes the first threshold to be smaller when the first direction is the specific direction than when the first direction is not the specific direction.

2. The apparatus according to claim 1, further comprising an approach direction determination unit configured to determine the approach direction of the operation body toward the operation surface,
wherein the touch detection unit is a capacitance-type touch sensor, and
wherein the approach direction determination unit makes the determination based on a distribution of capacitances generated due to proximity of the operation body.

3. The apparatus according to claim 2, wherein:
the touch sensor is composed of a plurality of sensors that are arranged two-dimensionally,
when a difference between output values of adjacent sensors that adjacently sandwich a largest capacitance sensor is equal to or larger than a threshold on an occurrence of the touch operation, the approach direction determination unit determines that an approach has been made by traversing one of the adjacent sensors with a larger output value, and
the approach direction determination unit makes the determination separately for a horizontal direction component and a vertical direction component.

4. The apparatus according to claim 1, wherein the specific direction is opposite to the approach direction of the operation body toward the operation surface.

5. The apparatus according to claim 1, wherein when the approach direction is from up, down, left, or right, the change unit changes the determination condition so that a direction opposite to the approach direction is determined as the operating direction of the slide move operation compared to other directions.

6. The apparatus according to claim 1, wherein when the approach direction is from upper left, lower left, upper right, or lower right, the change unit changes the determination condition so that a leftward direction and a rightward direction are each determined as the operating direction of the slide move operation compared to other directions.

7. The apparatus according to claim 1, wherein the slide move operation is one of a drag and a flick.

8. An electronic apparatus, comprising:
a touch detection unit configured to detect a touch operation performed on an operation surface by an operation body;
a determination unit configured to, on an occurrence of a slide move operation in which the operation body moves while in contact with the operation surface, determine an operating direction of the slide move operation under a determination condition;
a changing unit configured to change the determination condition according to an approach direction of the operation body toward the operation surface; and
a control unit configured to perform control to execute a function corresponding to the operating direction determined by the determination unit,
wherein the change unit changes the determination condition so that a specific direction associated with the approach direction of the operation body toward the operation surface is determined as the operating direction of the slide move operation compared to other directions,
wherein the determination unit:
determines that the operating direction of the slide move operation is a first direction when, from move components of the slide move operation, a move component in the first direction has exceeded a first threshold before a move component in a second direction different from the first direction exceeds a second threshold, and
determines that the operating direction of the slide move operation is the specific direction when, from the move components of the slide move operation, the move component in the second direction has exceeded the second threshold before the move component in the first direction exceeds the first threshold, and when the first direction is the specific direction, the change unit changes the first threshold to be smaller than the second threshold.

9. An electronic apparatus, comprising:
a touch detection unit configured to detect a touch operation performed on an operation surface by an operation body;
a determination unit configured to, on an occurrence of a slide move operation in which the operation body moves while in contact with the operation surface, determine an operating direction of the slide move operation under a determination condition;
a changing unit configured to change the determination condition according to an approach direction of the operation body toward the operation surface; and
a control unit configured to perform control to execute a function corresponding to the operating direction determined by the determination unit,
wherein the change unit changes the determination condition so that a specific direction associated with the approach direction of the operation body toward the operation surface is determined as the operating direction of the slide move operation compared to other directions,
wherein:
the determination unit determines the operating direction by comparing a move component in a first direction with a move component in a second direction from move components of the slide move operation, and
when the first direction is the specific direction, the change unit changes the determination condition so that the determination unit compares a result of weighting the move component in the first direction with the move component in the second direction.

10. The apparatus according to claim 1, wherein:
the touch detection unit is capable of detecting a size of a touch region of contact between the operation body and the operation surface, and
on the occurrence of the slide move operation in which the operation body moves while in contact with the operation surface, the determination unit determines the operating direction of the slide move operation under a determination condition that varies according to the approach direction of the operation body toward the operation surface and the size of the touch region.

11. A control method of an electronic apparatus having a touch detection unit configured to detect a touch operation performed on an operation surface by an operation body, the method comprising:
on an occurrence of a slide move operation in which the operation body moves while in contact with the operation surface, determining an operating direction of the slide move operation under a determination condition;
changing the determination condition according to an approach direction of the operation body toward the operation surface; and
performing control to execute a function corresponding to the determined operating direction,
wherein the changing changes the determination condition so that a specific direction associated with the approach direction of the operation body toward the operation surface is determined as the operating direction of the slide move operation compared to other directions,
wherein the determining determines that the operating direction of the slide move operation is a first direction when, from move components of the slide move operation, a move component in the first direction has exceeded a first threshold, and
the changing changes the first threshold to be smaller when the first direction is the specific direction than when the first direction is not the specific direction.

12. A non-transitory computer-readable storage medium storing a program for causing a computer to function as a determination unit and a control unit of an electronic apparatus having a touch detection unit configured to detect a touch operation performed on an operation surface by an operation body, the program comprising:
code for, on an occurrence of a slide move operation in which the operation body moves while in contact with the operation surface, determining an operating direction of the slide move operation under a determination condition;
code for changing the determination condition according to an approach direction of the operation body toward the operation surface; and
code for performing control to execute a function corresponding to the determined operating direction,
wherein the changing changes the determination condition so that a specific direction associated with the approach direction of the operation body toward the operation surface is determined as the operating direction of the slide move operation compared to other directions,
wherein the determining determines that the operating direction of the slide move operation is a first direction when, from move components of the slide move operation, a move component in the first direction has exceeded a first threshold, and
the changing changes the first threshold to be smaller when the first direction is the specific direction than when the first direction is not the specific direction.

* * * * *